(12) United States Patent
Yamaguchi et al.

(10) Patent No.: US 9,166,221 B2
(45) Date of Patent: Oct. 20, 2015

(54) ANODE AND BATTERY WITH IMPROVED CHARGE-DISCHARGE EFFICIENCY AND METHOD MANUFACTURING THE SAME

(75) Inventors: Hiroyuki Yamaguchi, Fukushima (JP);
Hiroshi Horiuchi, Fukushima (JP);
Kenichi Kawase, Fukushima (JP);
Tadahiko Kubota, Kanagawa (JP);
Hideki Nakai, Fukushima (JP);
Takakazu Hirose, Fukushima (JP)

(73) Assignee: SONY CORPORATION, Tokyo (JP)

( * ) Notice: Subject to any disclaimer, the term of this patent is extended or adjusted under 35 U.S.C. 154(b) by 1205 days.

(21) Appl. No.: 12/974,421

(22) Filed: Dec. 21, 2010

(65) Prior Publication Data

US 2011/0086269 A1    Apr. 14, 2011

Related U.S. Application Data

(62) Division of application No. 11/995,802, filed as application No. PCT/JP2007/060401 on May 22, 2007, now Pat. No. 8,932,761.

(30) Foreign Application Priority Data

May 23, 2006  (JP) ................. 2006-142977
May 23, 2006  (JP) ................. 2006-142978
May 11, 2007  (JP) ................. 2007-127005
May 11, 2007  (JP) ................. 2007-127006

(51) Int. Cl.
*H01M 4/134*    (2010.01)
*H01M 4/13*    (2010.01)
(Continued)

(52) U.S. Cl.
CPC ............... *H01M 4/134* (2013.01); *H01M 4/13* (2013.01); *H01M 4/139* (2013.01); *H01M 4/366* (2013.01);
(Continued)

(58) Field of Classification Search
CPC ....... H01M 4/134; H01M 4/131; H01M 4/13;
H01M 4/366; H01M 4/386; H01M 4/387;
H01M 4/0404; H01M 4/0423; H01M 4/64;
H01M 10/052; Y02E 60/122; C25B 11/0405;
C25B 11/0421; C25B 11/0452; C23C 18/1216; C23C 18/08
USPC .............. 429/218.1, 209, 233, 236, 242, 221, 429/223, 229, 220; 204/291, 290.01; 427/126.1, 126.3, 77
See application file for complete search history.

(56) References Cited

U.S. PATENT DOCUMENTS 5,696,206 A  * 12/1997  Chen et al. ................... 525/186
2004/0091780 A1 *  5/2004  Kinoshita et al. .......... 429/231.1

FOREIGN PATENT DOCUMENTS

JP       08-333603    * 12/1996  ............... B22F 1/02
JP       2000-012018    1/2000
(Continued)

*Primary Examiner* — Raymond Alejandro
(74) *Attorney, Agent, or Firm* — Dentons US LLP

(57) ABSTRACT

An anode in which an anode active material layer is arranged on an anode current collector. The anode active material layer includes anode active material particles made of an anode active material including at least one of silicon and tin as an element. An oxide-containing film including an oxide of at least one kind selected from the group consisting of silicon, germanium and tin is formed in a region in contact with an electrolytic solution of the surface of each anode active material particle by a liquid-phase method such as a liquid-phase deposition method. The region in contact with the electrolytic solution of the surface of each anode active material particle is covered with the oxide-containing film, to thereby improve the chemical stability of the anode and the charge-discharge efficiency. The thickness of the oxide-containing film is preferably within a range from 0.1 nm to 500 nm both inclusive.

7 Claims, 8 Drawing Sheets

(51) Int. Cl.
  *H01M 4/139* (2010.01)
  *H01M 4/36* (2006.01)
  *H01M 4/38* (2006.01)
  *H01M 4/485* (2010.01)
  *H01M 10/0567* (2010.01)
  *H01M 10/0569* (2010.01)
  *H01M 10/058* (2010.01)
  *H01M 4/131* (2010.01)
  *H01M 10/052* (2010.01)
  *H01M 4/02* (2006.01)

(52) U.S. Cl.
  CPC ............. *H01M 4/38* (2013.01); *H01M 4/485* (2013.01); *H01M 10/058* (2013.01); *H01M 10/0567* (2013.01); *H01M 10/0569* (2013.01); *H01M 4/131* (2013.01); *H01M 10/052* (2013.01); *H01M 2004/027* (2013.01); *H01M 2300/0028* (2013.01); *H01M 2300/0034* (2013.01); *Y02E 60/122* (2013.01)

(56) References Cited

FOREIGN PATENT DOCUMENTS

| | | | | |
|---|---|---|---|---|
| JP | 2004-171874 | | 6/2004 | |
| JP | 2004-319469 | | 11/2004 | |
| JP | 2005-26144 | * | 1/2005 | ............ H01M 12/06 |
| JP | 2005-317446 | | 11/2005 | |
| WO | 2006/033358 | | 3/2006 | |

* cited by examiner

ANODE AND BATTERY WITH IMPROVED CHARGE-DISCHARGE EFFICIENCY AND METHOD MANUFACTURING THE SAME

RELATED APPLICATION DATA

This application is a division of U.S. patent application Ser. No. 11/995,802, filed Jan. 15, 2008, which is co-pending, the entirety of which is incorporated herein by reference to the extent permitted by law. U.S. patent application Ser. No. 11/995,802 is the Section 371 National Stage of PCT/JP2007/060401. This application claims the benefit of priority to Japanese Patent Application Nos. 2006-142977, 2006-142978 filed May 23, 2006, 2007-127005 and 2007 127006 filed May 11, 2007.

BACKGROUND OF THE INVENTION

The present invention relates to an anode including an anode active material which includes at least one of silicon (Si) and tin (Sn) as an element, and a method of manufacturing the anode, and a battery and a method of manufacturing the battery.

In recent years, a large number of portable electronic devices such as camcorders, digital still cameras, cellular phones, personal digital assistances and laptop computers have been emerged, and an attempt to reduce the size and the weight of them has been made. Accordingly, the development of lightweight secondary batteries capable of obtaining a high energy density as power sources for the electronic devices have been promoted. Among them, a lithium-ion secondary battery using a carbon material for an anode, a composite material of lithium (Li) and a transition metal for a cathode and a carbonate for an electrolytic solution has been widely put to practical use, because the lithium-ion secondary battery can obtain a larger energy density than a lead-acid battery and a nickel-cadmium battery in related arts.

Moreover, recently as the performance of portable electronic devices is enhanced, a further improvement in capacity is desired, and it is considered to use tin, silicon or the like as an anode active material instead of a carbon material (for example, refer to Patent Literature 1). It is because the theoretical capacity of tin, 994 mAh/g, and the theoretical capacity of silicon, 4199 mAh/g are much larger than the theoretical capacity of graphite, 372 mAh/g, so an increase in capacity can be expected.

However, a tin alloy or a silicon alloy into which lithium is inserted has high activity, so there is an issue that an electrolytic solution is easily decomposed, and lithium is inactivated. Therefore, when charge and discharge are repeated, charge-discharge efficiency declines, thereby sufficient cycle characteristics cannot be obtained.

Therefore, it is considered to form an inert layer on a surface of an anode active material, and, for example, it is proposed to form a coating film of silicon oxide on a surface of an anode active material (for example, refer to Patent Literature 2). On the other hand, it is considered that when the thickness of the coating film of silicon oxide is increased, reaction resistance is increased, thereby cycle characteristics become insufficient (for example, refer to Patent Literature 3). In the past, such a coating film of silicon oxide is formed by air oxidation or a vapor-phase method.

[Patent Literature 1] U.S. Pat. No. 4,950,566
[Patent Literature 2] Japanese Unexamined Patent Application Publication No. 2004-171874
[Patent Literature 3] Japanese Unexamined Patent Application Publication No. 2004-319469

SUMMARY OF THE INVENTION

However, there are an issue that properties of a coating film formed by air oxidation are poor and an issue that anode active material particles are not sufficiently covered with a coating film formed by a vapor-phase method, thereby sufficient cycle characteristics cannot be obtained, so a further improvement is desired.

In view of the foregoing, it is an object of the invention to provide an anode capable of improving charge-discharge efficiency and a method of manufacturing the anode, and a battery using the anode, and a method of manufacturing the battery.

A first anode according to the invention is used in a battery including a cathode, an anode and an electrolyte, and the anode includes: an anode current collector; and an anode active material layer arranged on the anode current collector, wherein the anode active material layer includes anode active material particles including at least one of silicon and tin as an element, and each of the anode active material particles includes an oxide-containing film including an oxide of at least one kind selected from the group consisting of silicon, germanium and tin in a region in contact with the electrolyte of its surface. In this case, the oxide-containing film is formed by a liquid-phase method.

A method of manufacturing an anode according to the invention is a method of manufacturing an anode used in a battery including a cathode, an anode and an electrolyte, and the method includes: a step of arranging an anode active material layer including anode active material particles on an anode current collector, the anode active material particles including at least one of silicon and tin; and a step of forming an oxide-containing film including an oxide of at least one kind selected from silicon, germanium and tin in a region in contact with the electrolyte of the surface of each of the anode active material particles by a liquid-phase method.

A first battery according to the invention includes a cathode, an anode and an electrolyte, and the anode is the above-described anode according to the invention. Moreover, in a method of manufacturing a battery according to the invention, an anode is manufactured by the above-described method of manufacturing an anode according to the invention.

In the first anode and the first battery according to the invention, the oxide-containing film is formed in a region in contact with the electrolyte of the surface of each anode active material particle by a liquid-phase method, so the region in contact with the electrolyte of the surface of each anode active material particle can be uniformly covered with the oxide-containing film, and chemical stability can be improved. Therefore, in the battery using the anode, charge-discharge efficiency can be improved.

In the method of manufacturing an anode and the method of manufacturing a battery according to the invention, the oxide-containing film is formed by a liquid-phase method, so the oxide-containing film can be formed in the interior, which cannot be not covered with the oxide-containing film by a vapor-phase method, of the anode active material layer, and the anode according to the invention can be easily manufactured.

A second anode according to the invention includes: an anode current collector; and an anode active material layer arranged on the anode current collector, wherein the anode active material layer includes an anode active material including at least one of silicon and tin as an element, and the anode active material includes a coating film including an oxide of at least one kind selected from the group consisting of silicon, germanium (Ge) and tin and a halide of at least one kind selected from the group consisting of silicon, germanium and tin on at least a part of its surface.

A second battery according to the invention includes a cathode, an anode and an electrolyte, wherein the anode includes an anode current collector and an anode active material layer arranged on the anode current collector, the anode active material layer includes an anode active material including at least one of silicon and tin as an element, and the anode active material includes a coating film including an oxide of at least one kind selected from the group consisting of silicon, germanium and tin and a halide of at least one kind selected from the group consisting of silicon, germanium and tin in at least a part of its surface.

In the second anode according to the invention, a coating film including an oxide of at least one kind selected from the group consisting of silicon, germanium and tin and a halide of at least one kind selected from the group consisting of silicon, germanium and tin is arranged on at least a part of a surface of the anode active material, so chemical stability can be improved. Therefore, in the second battery using the second anode, charge-discharge efficiency can be improved.

DETAILED DESCRIPTION OF THE PRESENTLY PREFERRED EMBODIMENTS

Preferred embodiments will be described in detail below referring to the accompanying drawings.

First Embodiment

First Type Battery

Figure 1:
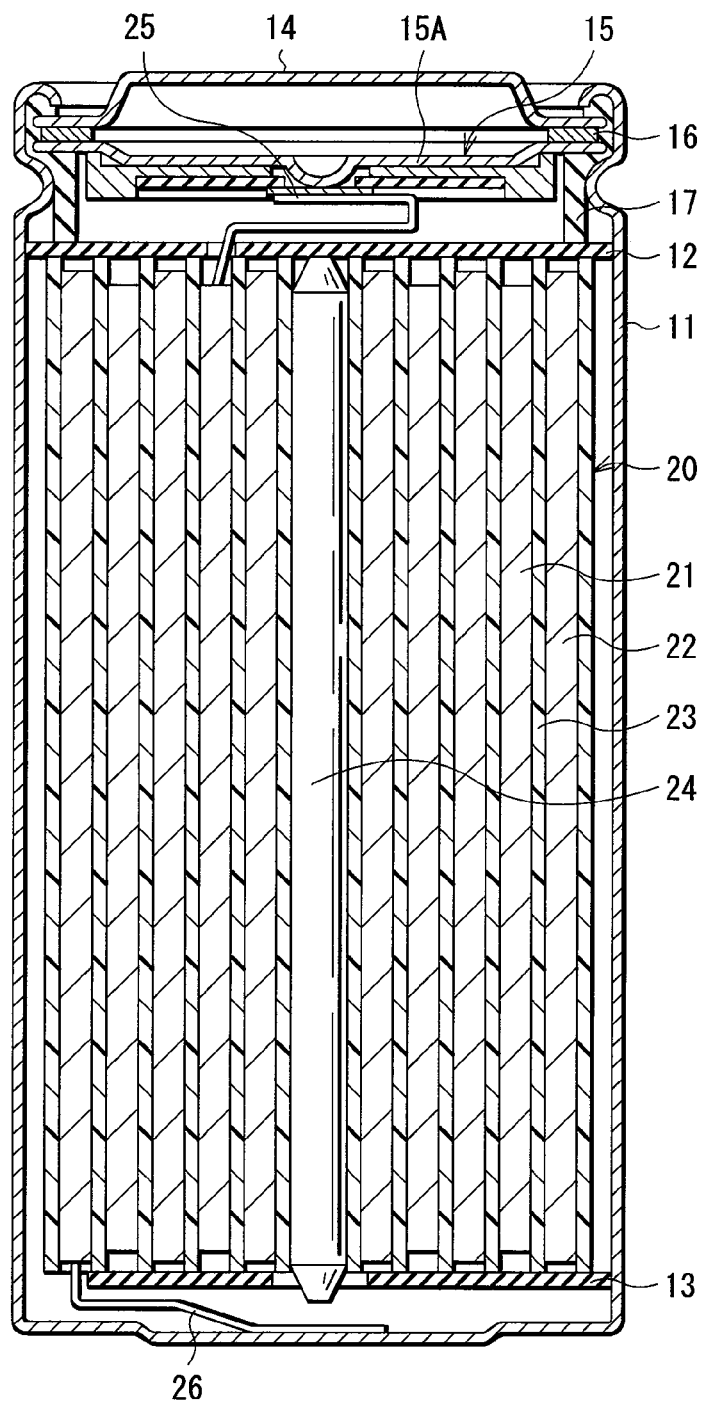
FIG. 1 is a sectional view showing a configuration of a first type secondary battery according to a first embodiment of the invention.

FIG. 1 shows a sectional configuration of a first type secondary battery according to a first embodiment of the invention. The secondary battery is a so-called cylindrical type, and includes a spirally wound electrode body 20 which includes a strip-shaped cathode 21 and a strip-shaped anode 22 spirally wound with a separator 23 in between in a substantially hollow cylindrical-shaped battery can 11. The battery can 11 is made of, for example, nickel-plated iron, and an end portion of the battery can 11 is closed, and the other end portion thereof is opened. An electrolytic solution as a liquid electrolyte is injected into the battery can 11, and the separator 23 is impregnated with the electrolytic solution. Moreover, a pair of insulating plates 12 and 13 are arranged so that the spirally wound electrode body 20 is sandwiched therebetween in a direction perpendicular to a peripheral winding surface.

In the opened end portion of the battery can 11, a battery cover 14, and a safety valve mechanism 15 and a positive temperature coefficient device (PTC device) 16 arranged inside the battery cover 14 are mounted by caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and in the safety valve mechanism 15, when an internal pressure in the battery increases to a certain extent or higher due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance to prevent abnormal heat generation by a large current. The gasket 17 is made of, for example, an insulating material, and its surface is coated with asphalt.

A center pin 24 is inserted into the center of the spirally wound electrode body 20. In the spirally wound electrode body 20, a cathode lead 25 made of aluminum (Al) or the like is connected to the cathode 21, and an anode lead 26 made of nickel or the like is connected to the anode 22. The cathode lead 25 is welded to the safety valve mechanism 15 so as to be electrically connected to the battery cover 14, and the anode lead 26 is welded to the battery can 11 so as to be electrically connected to the battery can 11.

Figure 2:
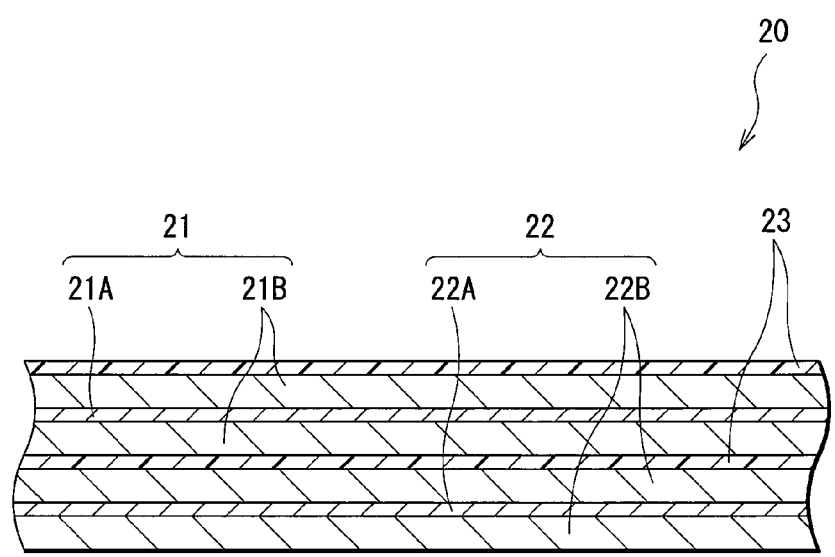
FIG. 2 is an enlarged sectional view showing a part of a spirally wound electrode body in the secondary battery shown in FIG. 1.

FIG. 2 shows an enlarged view of a part of the spirally wound electrode body 20 shown in FIG. 1. The cathode 21 has a configuration in which a cathode active material layer 21B is arranged on both sides of a cathode current collector 21A having a pair of facing surfaces. The cathode current collector 21A is made of, for example, a metal material such as aluminum.

The cathode active material layer 21B includes, for example, one kind or two or more kinds of cathode materials capable of inserting and extracting lithium as cathode active materials, and the cathode active material layer 21B may include an electrical conductor such as a carbon material and a binder such as polyvinylidene fluoride, if necessary. For example, as the cathode material capable of inserting and extracting lithium, a chalcogenide which does not include lithium such as titanium sulfide ($TiS_2$), molybdenum sulfide ($MoS_2$), niobium selenide ($NbSe_2$) or vanadium oxide ($V_2O_5$) or a lithium-containing compound including lithium is cited.

Among them, the lithium-containing compound is preferable, because some of the lithium-containing compounds can obtain a high voltage and a high energy density. As such a lithium-containing compound, for example, a complex oxide including lithium and a transition metal element, or a phosphate compound including lithium and a transition metal element is cited, and in particular, a lithium-containing compound including at least one kind selected from the group consisting of cobalt, nickel, manganese and iron is preferable. It is because a higher voltage can be obtained. The chemical formula of the lithium-containing compound is represented by, for example, $Li_xMIO_2$ or $Li_yMIIPO_4$. In the formulas, MI and MII each represent one or more kinds of transition metal elements. The values of x and y depend on a charge-discharge state of the battery, and are generally within a range of $0.05 \leq x \leq 1.10$ and $0.05 \leq y \leq 1.10$, respectively.

Specific examples of the complex oxide including lithium and a transition metal element include lithium-cobalt complex oxide ($Li_xCoO_2$), lithium-nickel complex oxide ($Li_xNiO_2$), lithium-nickel-cobalt complex oxide ($Li_xNi_{1-z}Co_zO_2$ (z<1)), lithium-nickel-cobalt-manganese complex oxide ($Li_xNi_{(1-v-w)}Co_vMn_wO_2$ (v+w<1)), lithium-manganese complex oxide ($LiMn_2O_4$) having a spinel structure. Among them, a complex oxide including nickel is preferable. It is because a high capacity can be obtained, and superior cycle characteristics can be obtained. Specific examples of the phosphate compound including lithium and a transition metal element include a lithium-iron phosphate compound ($LiFePO_4$) and a lithium-iron-manganese phosphate compound ($LiFe_{1-u}Mn_uPO_4$ (u<1)).

For example, as in the case of the cathode 21, the anode 22 has a configuration in which an anode active material layer 22B is arranged on both sides of an anode current collector 22A having a pair of facing surfaces. The anode current collector 22A is made of, for example, a metal material such as copper.

The anode active material layer 22B includes an anode active material including at least one of silicon and tin as an element. It is because silicon and tin have a high capability to insert and extract lithium, and can obtain a high energy density.

Examples of the anode active material including at least one of silicon and tin include the simple substance, an alloy and a compound of silicon, and the simple substance, an alloy and a compound of tin, and an anode active material including a phase including one kind or two or more kinds selected from them at least in part. In the invention, the alloy includes an alloy including one or more kinds of metal elements and one or more kinds of metalloid elements in addition to an alloy including two or more kinds of metal elements. Further, the alloy may include a non-metal element. As the texture of the alloy, a solid solution, a eutectic (eutectic mixture), an intermetallic compound or the coexistence of two or more kinds selected from them is cited.

As an alloy of silicon, for example, an alloy including at least one kind selected from the group consisting of tin, nickel (Ni), copper (Cu), iron (Fe), cobalt (Co), manganese (Mn), zinc (Zn), indium (In), silver (Ag), titanium (Ti), germanium, bismuth (Bi), antimony (Sb) and chromium (Cr) as a second element in addition to silicon is cited. As an alloy of tin, for example, an alloy including at least one kind selected from the group consisting of silicon, nickel, copper, iron, cobalt, manganese, zinc, indium, silver, titanium, germanium, bismuth, antimony and chromium as a second element in addition to tin is cited.

As a compound of silicon and a compound of tin, for example, a compound including oxygen (O) or carbon (C) is cited, and the compound may include the above-described second element in addition to silicon or tin.

Among them, a SnCoC-containing material in which tin, carbon and cobalt are included as elements, and the carbon content is within a range from 9.9 wt % to 29.7 wt % both inclusive, and the ratio of cobalt to the total of tin and cobalt (Co/(Sn+Co)) is within a range from 30 wt % to 70 wt % both inclusive is preferably included. It is because a high energy density and superior cycle characteristics can be obtained in such a composition range.

The SnCoC-containing material may further include any other element, if necessary. As the element, for example, silicon, iron, nickel, chromium, indium, niobium (Nb), germanium, titanium, molybdenum (Mo), aluminum, phosphorus (P), gallium (Ga) or bismuth is preferable, and two or more kinds selected from them may be included. It is because the capacity or the cycle characteristics can be further improved.

The SnCoC-containing material includes a phase including tin, cobalt and carbon, and the phase preferably has a low crystalline structure or an amorphous structure. Moreover, in the SnCoC-containing material, at least a part of carbon as an element is preferably bonded to a metal element or a metalloid element as another element. It is considered that a decline in the cycle characteristics is caused by cohesion or crystallization of tin or the like, and when carbon is bonded to another element, such cohesion or crystallization can be prevented.

As a measuring method for checking the bonding state of an element, for example, X-ray photoelectron spectroscopy (XPS) is used. In the XPS, the peak of the is orbit (C1s) of carbon in the case of graphite is observed at 284.5 eV in an apparatus in which energy calibration is performed so that the peak of the 4f orbit (Au4f) of a gold atom is observed at 84.0 eV. Moreover, the peak of C1s of the surface contamination carbon is observed at 284.8 eV. On the other hand, in the case where the charge density of the carbon element increases, for example, in the case where carbon is bonded to a metal element or a metalloid element, the peak of C1s is observed in a region lower than 284.5 eV. In other words, in the case where the peak of the composite wave of C is obtained in the SnCoC-containing material is observed in a region lower than 284.5 eV, at least a part of carbon included in the SnCoC-containing material is bonded to the metal element or the metalloid element which is another element.

Moreover, in the XPS measurement, for example, the peak of C1s is used to correct the energy axis of a spectrum. In general, surface contamination carbon exists on a material surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the SnCoC-containing material, so the peak of the surface contamination carbon and the peak of the carbon in the SnCoC-containing material are separated by analyzing the waveform through the use of, for example, commercially available software. In the analysis of the waveform, the position of a main peak existing on a lowest binding energy side is used as an energy reference (284.8 eV).

Such an anode active material can be manufactured, for example, by mixing the materials of all elements to form a mixture, melting the mixture in an electric furnace, a high-frequency induction furnace, an arc furnace or the like, and then solidifying the mixture, or by various atomization methods such as gas atomization or water atomization, various roll methods, or methods using a mechanochemical reaction such as a mechanical alloying method or a mechanical milling method. Among them, the anode active material is preferably manufactured by a method using a mechanochemical reaction. It is because the anode active material can have a low crystalline structure or an amorphous structure. In this method, for example, a manufacturing apparatus such as a planetary ball mill or an attritor can be used.

The anode active material layer 22B may further include any other anode active material or any other material such as an electrical conductor in addition to the above-described anode active material. As the other anode active material, for example, a carbonaceous material capable of inserting and extracting lithium is cited. The carbonaceous material is preferable, because charge-discharge cycle characteristics can be improved, and the carbonaceous material also functions as an electrical conductor. As the carbonaceous material, for example, one kind or two or more kinds selected from the group consisting of non-graphitizable carbon, graphitizable carbon, graphite, kinds of pyrolytic carbon, kinds of coke, kinds of glass-like carbon, a fired organic polymer body, activated carbon, and carbon black can be used. Among them, kinds of coke include pitch coke, needle coke, petroleum coke and the like, and the fired organic polymer body is formed by firing a polymer compound such as a phenolic resin or a furan resin at an appropriate temperature to carbonize the polymer compound. The carbonaceous materials may have a fiber form, a spherical form, a particle form or a scale form.

The anode active material layer 22B includes anode active material particles made of the above-described anode active material. On a region in contact with the electrolytic solution of the surface of each anode active material particle, that is, a region except for a region in contact with the anode current collector 22A, the binder or other anode active material particles, an oxide-containing film including an oxide of at least one kind selected from silicon, germanium and tin is formed. It is desirable that the oxide-containing film is formed on nearly the whole region in contact with the electrolytic solution of the surface of each anode active material particle, and most of anode active material particles are not exposed.

The oxide-containing film may be formed by a liquid-phase method such as a liquid-phase deposition method, a sol-gel method, a coating method or dip coating method.

Among them, the oxide-containing film is preferably formed by a liquid-phase deposition method. It is because by the liquid-phase deposition method, the oxide-containing film can be deposited by easily controlling an oxide. The liquid-phase deposition method is, for example, a a method of depositing an oxide on a surface of the anode active material layer 22B to form the oxide-containing film by adding a dissolved species which easily coordinates fluorine (F) as an anion trapping agent to a solution of a fluoride complex of silicon, tin or germanium to mix them, and immersing the anode current collector 22A on which the anode active material layer 22B is formed in the mixture, and then trapping a fluorine anion generated from the fluoride complex by the dissolved species. Instead of the fluoride complex, for example, a silicon compound, a tin compound or a germanium compound generating another anion such as a sulfate ion may be used. Moreover, in the case where the oxide-containing film is formed by the sol-gel method, a treatment liquid including a fluorine anion, or a compound including fluorine and one kind selected from the group consisting of Group 13 to 15 elements (more specifically, a fluorine ion, a tetrafluoroborate ion, a hexafluorophosphate ion or the like) as a reaction accelerator may be used. It is because in the oxide-containing film obtained by such a manner, the content of an alkoxy group is low, and a gas generation amount in the case where the oxide-containing film functions as an anode in an electrochemical device such as a battery is reduced.

For example, the thickness of the oxide-containing film is preferably within a range from 0.1 nm to 500 nm both inclusive. It is because when the thickness is 0.1 nm or more, the anode active material particles can be covered with the oxide-containing film, and when the thickness is 500 nm or less, a decline in energy density can be prevented. Moreover, for example, the thickness is more preferably within a range from 1 nm to 200 nm both inclusive, and more preferably from 10 nm to 150 nm both inclusive, and more preferably from 20 nm to 100 nm both inclusive. It is because anode active material particles 22C can be sufficiently covered, and a decline in energy density can be reduced, and a higher effect can be obtained.

The anode active material layer 22B preferably includes a metal formed in gaps between adjacent anode active material particles together with a plurality of anode active material particles covered with the above-described oxide-containing film. The metal includes a metal element not alloyed with an electrode reactant. As the metal element, at least one kind selected from the group consisting of iron (Fe), cobalt (Co), nickel (Ni), zinc (Zn) and copper (Cu) is cited. In such a configuration, the anode active material particles are bonded by the metal.

To improve the bonding property of the metal, it is desired to sufficiently fill gaps between adjacent anode active material particles with the metal. In this case, a part of gaps may be filled with the metal; however, a larger filling amount of the metal is more preferable. It is because the bonding property of the anode active material layer 22B is improved.

Moreover, such a metal may be fixed not only in the gaps between anode active material particles but also on the surfaces of the anode active material particles. It is because the surface area of the anode active material particles can be reduced, and the formation of an irreversible film which may be a potential impediment to the progress of electrode reaction can be prevented. For example, in the case where the anode active material particles are formed by a vapor-phase method or the like, beard-like fine projections are formed on the surfaces of the anode active material particles, so a large number of gaps between the projections are formed. The gaps cause an increase in the surface area of the anode active material particles; however, when the above-described metal is arranged in advance, in the case where the metal functions as an anode in an electrochemical device such as a battery, the irreversible film formed on the surfaces of the anode active material particles is reduced.

The separator 23 isolates between the cathode 21 and the anode 22 so that lithium ions pass therethrough while preventing a short circuit of a current due to contact between the cathode 21 and the anode 22. The separator 23 is made of, for example, a porous film of a synthetic resin such as polytetrafluoroethylene, polypropylene or polyethylene, or a porous ceramic film, and the separator 23 may have a configuration in which two or more kinds of the porous films are laminated.

The electrolytic solution with which the separator 23 is impregnated includes a solvent and an electrolyte salt dissolved in the solvent.

Examples of the solvent include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide, dimethyl sulfoxide phosphate and the like. Only one kind or mixture of a plurality of kinds selected from them may be used. Among them, at least one kind selected from the group consisting of ethylene carbonate, propylene carbonate, dimethyl carbonate, diethyl carbonate and ethyl methyl carbonate is preferable. It is because better cycle characteristics can be obtained. In this case, in particular, Among them, the solvent preferably includes a mixture of a high-viscosity (high-permittivity) solvent (for example, relative permittivity $\epsilon \geq 30$) such as ethylene carbonate or propylene carbonate and a low-viscosity solvent (for example, viscosity ≤1 mPa·s) such as dimethyl carbonate, ethyl methyl carbonate or diethyl carbonate. It is because the dissociation property of the electrolyte salt and ion mobility are improved, so a higher effect can be obtained.

The solvent preferably further includes a cyclic carbonate including an unsaturated bond. It is because the decomposition reaction of the electrolytic solution including such a solvent is further prevented, and cycle characteristics are further improved. As the cyclic carbonate including an unsaturated bond, for example, at least one kind selected from the group consisting of a vinylene carbonate-based compound, a vinylethylene carbonate-based compound and an ethylene methylene carbonate-based compound is cited.

Examples of the vinylene carbonate-based compound include vinylene carbonate (1,3-dioxol-2-one), methylvinylene carbonate (4-methyl-1,3-dioxol-2-one), ethylvinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, 4-trifluoromethyl-1,3-dioxol-2-one and the like.

Examples of the vinylethylene carbonate-based compound include vinylethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, 4,5-divinyl-1,3-dioxolane-2-one and the like.

Examples of the ethylene methylene carbonate-based compound include 4-methylene-1,3-dioxolane-2-one, 4,4-dimethyl-5-methylene-1,3-dioxolane-2-one, 4,4-diethyle-5-methylene-1,3-dioxolane-2-one and the like.

Only one kind or mixture of a plurality of kinds selected from them may be used. Among them, as the cyclic carbonate including an unsaturated bond, at least one kind selected from the group consisting of vinylene carbonate and vinyl ethylene carbonate is preferable. It is because a sufficient effect can be obtained. In this case, in particular, vinylene carbonate is more preferable than vinyl ethylene carbonate. It is because a higher effect can be obtained.

Moreover, for example, the solvent preferably includes at least one kind selected from the group consisting of a chain carbonate represented by Chemical Formula 1 which includes a halogen as an element and a cyclic carbonate represented by Chemical Formula 2 which includes a halogen as an element. It is because the decomposition reaction of the electrolytic solution including the solvent is further prevented, and cycle characteristics are improved.

[Chemical Formula 1]

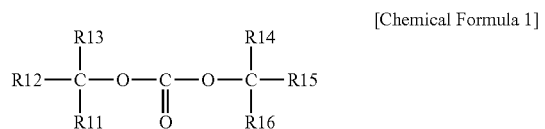

(where R11 to R16 each represent a hydrogen group, a halogen group, an alkyl group or a halogenated alkyl group, and they may be the same as or different from one another, and at least one of them is a halogen group or a halogenated alkyl group.)

[Chemical Formula 2]

(where R21 to R24 each represent a hydrogen group, a halogen group, an alkyl group or a halogenated alkyl group, and they may be the same as or different from one another, and at least one of them is a halogen group or a halogenated alkyl group.)

As the chain carbonate represented by Chemical Formula 1 which includes a halogen as an element, for example, fluoromethyl methyl carbonate, bis(fluoromethyl) carbonate, difluoromethyl methyl carbonate and the like are cited. Only one kind or mixture of a plurality of kinds selected from them may be used.

As the cyclic carbonate represented by Chemical Formula 2 which includes a halogen as an element, a series of compounds represented by Chemical Formulas 3 and 4 are cited. More specifically, 4-fluoro-1,3-dioxolane-2-one in Chemical Formula 3(1), 4-chloro-1,3-dioxolane-2-one in Chemical Formula 3(2), 4,5-difluoro-1,3-dioxolane-2-one in Chemical Formula 3(3), tetrafluoro-1,3-dioxolane-2-one in Chemical Formula 3(4), 4-fluoro-5-chloro-1,3-dioxolane-2-one in Chemical Formula 3(5), 4,5-dichloro-1,3-dioxolane-2-one in Chemical Formula 3(6), tetrachloro-1,3-dioxolane-2-one in Chemical Formula 3(7), 4,5-bistrifluoromethyl-1,3-dioxolane-2-one in Chemical Formula 3(8), 4-trifluoromethyl-1,3-dioxolane-2-one in Chemical Formula 3(9), 4,5-difluoro-4,5-dimethyl-1,3-dioxolane-2-one in Chemical Formula 3(10), 4-methyl-5,5-difluoro-1,3-dioxolane-2-one in Chemical Formula 3(11), 4-ethyl-5,5-difluoro-1,3-dioxolane-2-one in Chemical Formula 3(12) and the like are cited. Moreover, 4-trifluoromethyl-5-fluoro-1,3-dioxolane-2-one in Chemical Formula 4(1), 4-trifluoromethyl-5-methyl-1,3-dioxolane-2-one in Chemical Formula 4(2), 4-fluoro-4,5-dimethyl-1,3-dioxolane-2-one in Chemical Formula 4(3), 4,4-difluoro-5-(1,1-difluoroethyl)-1,3-dioxolane-2-one in Chemical Formula 4(4), 4,5-dichloro-4,5-dimethyl-1,3-dioxolane-2-one in Chemical Formula 4(5), 4-ethyl-5-fluoro-1,3-dioxolane-2-one in Chemical Formula 4(6), 4-ethyl-4,5-difluoro-1,3-dioxolane-2-one in Chemical Formula 4(7), 4-ethyl-4,5,5-trifluoro-1,3-dioxolane-2-one in Chemical Formula 4(8), 4-fluoro-4-methyl-1,3-dioxolane-2-one in Chemical Formula 4(9) and the like are cited. Only one kind or mixture of a plurality of kinds selected from them may be used. Among them, as the cyclic carbonate including a halogen as an element, at least one kind selected from the group consisting of 4-fluoro-1,3-dioxolane-2-one and 4,5-difluoro-1,3-dioxolane-2-one is preferable. It is because they are easily available, and a sufficient effect can be obtained. In this case, in particular, 4,5-difluoro-1,3-dioxolane-2-one is more preferable than 4-fluoro-1,3-dioxolane-2-one. It is because a higher effect can be obtained. More specifically, to obtain a higher effect, a trans-isomer is more preferable than a cis-isomer.

[Chemical Formula 3]

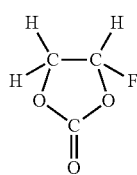
(1)

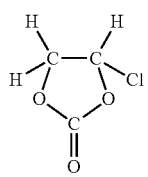
(2)

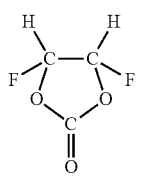 (3)
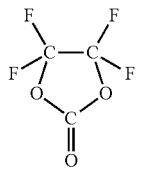 (4)
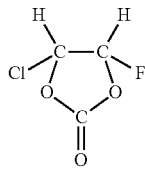 (5)
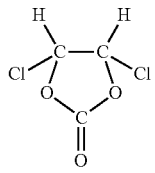 (6)
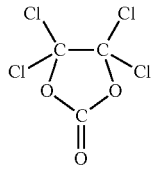 (7)
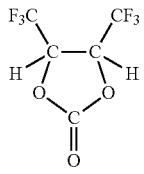 (8)
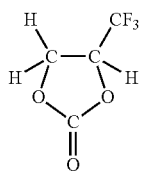 (9)
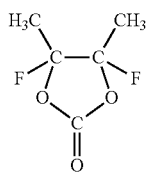 (10)
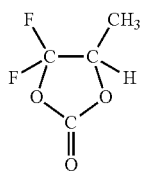 (11)
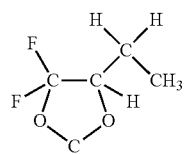 (12)
[Chemical Formula 4]
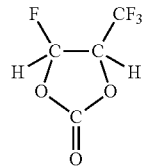 (1)
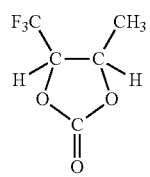 (2)
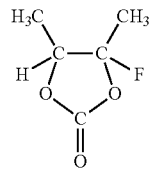 (3)
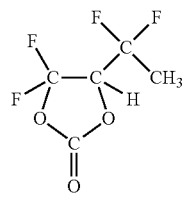 (4)
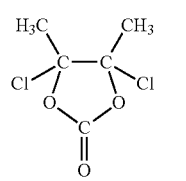 (5)
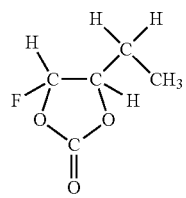 (6)
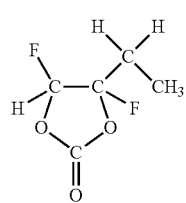 (7)

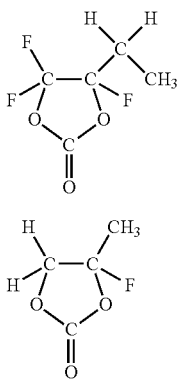

Moreover, for example, the solvent preferably further includes a sultone (a cyclic sulfonate) or an acid anhydride. It is because the decomposition reaction of the electrolytic solution including the solvent is further prevented, and cycle characteristics are improved.

As the sultone, for example, propane sultone, propene sultone or the like is cited. Only one kind or mixture of a plurality of kinds selected from them may be used. Among them, as the sultone, propene sultone is preferable. Moreover, the content of the sultone in the electrolytic solution is preferably within a range from 0.5 wt % to 3 wt % both inclusive. It is because a sufficient effect can be obtained.

As the acid anhydride, for example, succinic anhydride, glutaric anhydride, maleic anhydride, sulfobenzoic anhydride, sulfopropionic anhydride, sulfobutyric anhydride or the like is cited. Only one kind or mixture of a plurality of kinds selected from them may be used. Among them, as the acid anhydride, at least one kind selected from the group consisting of succinic anhydride and sulfobenzoic anhydride is preferable. It is because a sufficient effect can be obtained. In this case, in particular, sulfobenzoic anhydride is more preferable than succinic anhydride. It is because a higher effect can be obtained. The content of the acid anhydride in the electrolytic solution is preferably within a range from 0.5 wt % to 3 wt % both inclusive. It is because a sufficient effect can be obtained.

For example, the electrolyte salt preferably includes at least one kind selected from the group consisting of compounds represented by Chemical Formulas 5, 6 and 7. It is because sufficient electrical conductivity can be stably obtained, and cycle characteristics can be improved. Only one kind or mixture of a plurality of kinds selected from the compounds represented by Chemical Formulas 5 to 7 may be used.

[Chemical Formula 5]

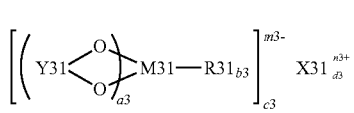

(where X31 represents a Group 1A element or a Group 2A element in the short form of the periodic table of the elements, or aluminum, M31 represents a transition metal, or a Group 3B element, a Group 4B element or a Group 5B element in the short form of the periodic table of the elements, R31 represents a halogen group, Y31 represents —OC—R32—CO—, —OC—CR33$_2$— or —OC—CO—, R32 represents an alkylene group, a halogenated alkylene group, an arylene group or a halogenated arylene group, R33 represents an alkyl group, a halogenated alkyl group, an aryl group or a halogenated aryl group and may be the same as or different from each other, a3 is an integer of 1 to 4, b3 is an integer of 0, 2 or 4, and c3, d3, m3 and n3 each are an integer of 1 to 3.)

[Chemical Formula 6]

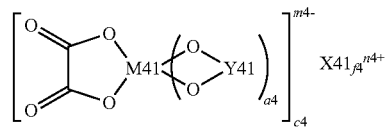

(where X41 represents a Group 1A element or a Group 2A element in the short form of the periodic table of the elements, M41 represents a transition metal, or a Group 3B element, a Group 4B element or a Group 5B element in the short form of the periodic table of the elements, Y41 represents —OC—(CR41$_2$)$_{b4}$—CO—, —R43$_2$C—(CR42$_2$)$_{c4}$—CO—, —R43$_2$C—(CR42$_2$)$_{c4}$—CR43$_2$—, —R43$_2$C—(CR42$_2$)$_{c4}$—SO$_2$—, —O$_2$S—(CR42$_2$)$_{d4}$—SO$_2$— or —OC—(CR42$_2$)d4-SO$_2$—, R41 and R43 each represent a hydrogen group, an alkyl group, a halogen group or a halogenated alkyl group and may be the same as or different from each other, and at least one of R41 and at least one of R43 each are a halogen group or a halogenated alkyl group, R42 represents a hydrogen group, an alkyl group, a halogen group or a halogenated alkyl group and may be the same as or different from each other, a4, e4 and n4 each are an integer of 1 or 2, b4 and d4 each are an integer of 1 to 4, c4 is an integer of 0 to 4, and f4 and m4 each are an integer of 1 to 3.)

[Chemical Formula 7]

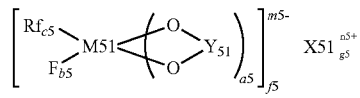

(where X51 represents a Group 1A element or a Group 2A element in the short form of the periodic table of the elements, M51 represents a transition metal, or a Group 3B element, a Group 4B element or a Group 5B element in the short form of the periodic table of the elements, Rf represents a fluorinated alkyl group having 1 to 10 carbon atoms or a fluorinated aryl group having 1 to 10 carbon atoms, Y51 represents OC—(CR51$_2$)$_{d5}$—CO—, —R52$_2$C—(CR51$_2$)$_{d5}$—CO—, —R52$_2$C—(CR51$_2$)$_{d5}$—CR52$_2$—, —R52$_2$C—(CR51$_2$)$_{d5}$—SO$_2$—, —O$_2$S—(CR51$_2$)$_{e5}$—SO$_2$— or —OC—(CR51$_2$)$_{e5}$—SO$_2$—, R51 represents a hydrogen group, an alkyl group, a halogen group or a halogenated alkyl group and may be the same as or different from each other, R52 represents a hydrogen group, an alkyl group, a halogen group or a halogenated alkyl group and may be the same as or different from each other, and at least one of R52 is a halogen group or a halogenated alkyl group, a5, f5 and n5 each are an integer of 1 or 2, b5, c5 and e5 each are an integer of 1 to 4, d5 is an integer of 0 to 4, and g5 and m5 each are an integer of 1 to 3.)

As examples of the compounds represented by Chemical Formulas 5 to 7, compounds represented by Chemical Formulas 8 and 9 are cited.

As the compound represented by Chemical Formula 5, for example, compounds represented by Chemical Formulas 8(1) to 8(6) are cited.

As the compound represented by Chemical Formula 6, for example, compounds represented by Chemical Formulas 9(1) to 9(8) are cited.

As the compound represented by Chemical Formula 7, for example, a compound represented by Chemical Formula 9(9) is cited.

Only one kind or a mixture of a plurality of kinds selected from them may be used. Among them, as the compounds represented by Chemical Formulas 5 to 7, the compounds represented by Chemical Formulas 8(6) and 9(2) are preferable. It is because a sufficient effect can be obtained. As long as the compounds have a configuration represented by Chemical Formulas 5 to 7, they are not limited to the compounds represented by Chemical Formula 8 or 9.

[Chemical Formula 8]

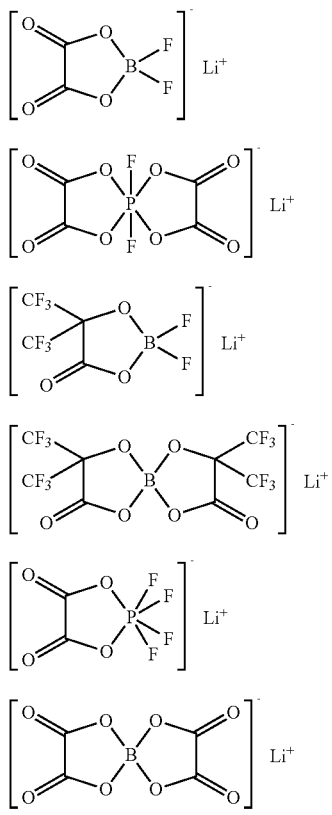

[Chemical Formula 9]

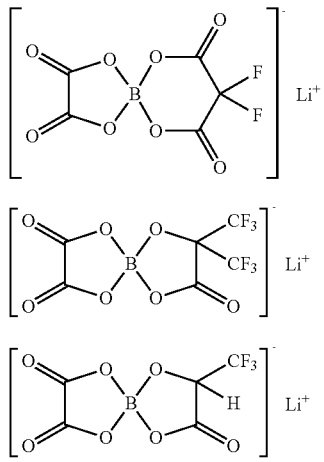

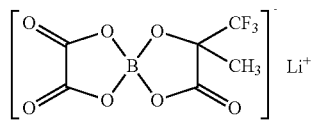

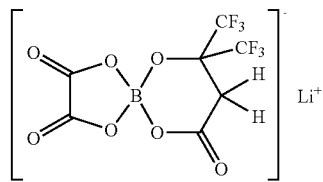

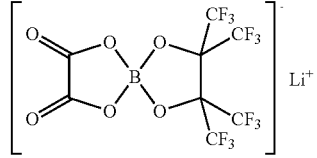

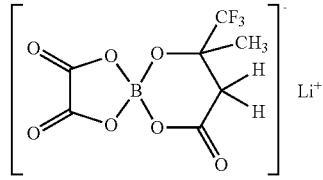

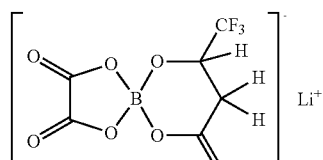

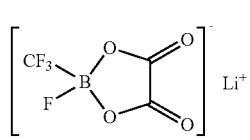

Moreover, for example, the electrolyte salt preferably includes any other electrolyte salt together with the compounds represented by Chemical Formulas 5 to 7. It is because a higher effect can be obtained. Examples of the other electrolyte salt include lithium hexafluorophosphate (LiPF$_6$), lithium tetrafluoroborate (LiBF$_4$), lithium perchlorate (LiClO$_4$), lithium hexafluoroarsenate (LiAsF$_6$), lithium tetraphenyl borate (LiB(C$_6$H$_5$)$_4$), lithium methanesulfonate (LiCH$_3$SO$_3$), lithium trifluoromethanesulfonate (LiCF$_3$SO$_3$), lithium tetrachloroaluminate (LiAlCl$_4$), lithium hexafluorosilicate (Li$_2$SiF$_6$), lithium chloride (LiCl), lithium bromide (LiBr) and the like. Only one kind or a plurality of kinds selected from them may be used. Among them, as the other electrolyte salt, at least one kind selected from the group consisting of lithium hexafluorophosphate, lithium tetrafluoroborate, lithium perchlorate and lithium hexafluoroarsenate is preferable. It is because a sufficient effect can be obtained. In this case, lithium hexafluorophosphate is more preferable. It is because internal resistance declines, so a higher effect can be obtained. In particular, the electrolyte salt may include the above-described compounds represented by Chemical Formulas 5 to 7 together with lithium hexafluorophosphate or the like.

Moreover, for example, the electrolyte salt preferably includes compounds represented by Chemical Formulas 10, 11 and 12. It is because a higher effect can be obtained. Only one kind or a mixture of a plurality of kinds selected from them may be used. In particular, when the electrolyte salt includes at least one kind selected from the group consisting of the compounds represented by Chemical Formulas 10 to 12 together with lithium hexafluorophosphate or the like, or when the electrolyte salt includes the compounds represented by Chemical Formulas 5 to 7 and the compound represented by Chemical Formulas 10 to 12 together with lithium hexafluorophosphate or the like, a higher effect can be obtained.

LiN(C$_m$F$_{2m+1}$SO$_2$)(C$_n$F$_{2n+1}$SO$_2$)    [Chemical Formula 10]

(where m and n each are an integer of 1 or more and may be the same as or different from each other.)

[Chemical Formula 11]

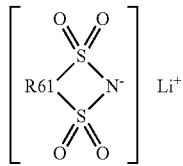

(R61 represents a straight-chain or branch perfluoroalkylene group having 2 to 4 carbon atoms.)

LiC(C$_p$F$_{2p-1}$SO$_2$)(C$_q$F$_{2q+1}$SO$_2$)(C$_r$F$_{2r+1}$SO$_2$)    [Chemical Formula 12]

(where p, q and r each are an integer of 1 or more and may be the same as or different from one another.)

As the chain compound represented by Chemical Formula 10, lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium (trifluoromethanesulfonyl)(heptafluoropropanesulfonyl)imide (LiN(CF$_3$SO$_2$)(C$_3$F$_7$SO$_2$)) or lithium (trifluoromethanesulfonyl)(nonafluorobutanesulfonyl)imide (LiN(CF$_3$SO$_2$)(C$_4$F$_9$SO$_2$)) and the like are cited. Only one kind or mixture of a plurality of kinds selected from them may be used.

As the cyclic compound represented by Chemical Formula 11, a series of compounds represented by Chemical Formula 13 are cited. More specifically, lithium 1,2-perfluoroethanedisulfonylimide in Chemical Formula 13(1), lithium 1,3-perfluoropropanedisulfonylimide in Chemical Formula 13(2), lithium 1,3-perfluorobutanedisulfonylimide in Chemical Formula 13(3), lithium 1,4-perfluorobutanedisulfonylimide in Chemical Formula 13(4) and the like are cited. Only one kind or mixture of a plurality of kinds selected from them may be used. Among them, as the cyclic compound represented by Chemical Formula 11, lithium 1,3-perfluoropropanedisulfonylimide is preferable. It is because a higher effect can be obtained.

[Chemical Formula 13]

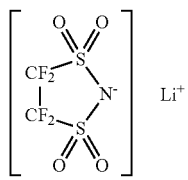
(1)

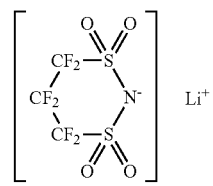
(2)

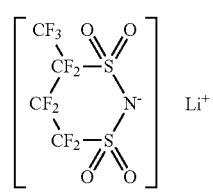
(3)

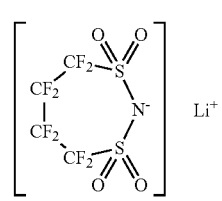
(4)

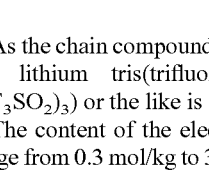

As the chain compound represented by Chemical Formula 12, lithium tris(trifluoromethanesulfonyl)methide (LiC(CF$_3$SO$_2$)$_3$) or the like is cited.

The content of the electrolyte salt is preferably within a range from 0.3 mol/kg to 3.0 mol/kg both inclusive relative to the solvent. When the content of the electrolyte salt is within the range, higher ionic conductivity can be obtained, and capacity characteristics of the battery can be sufficiently improved.

When the electrolytic solution with such a composition is used, the chemical stability of the electrolytic solution is improved, and the decomposition reaction in the battery is prevented.

The secondary battery can be manufactured by the following steps, for example.

At first, the cathode 21 is formed. More specifically, at first, the cathode active material, the electrical conductor and the binder are mixed to form a cathode mixture, and the cathode mixture is dispersed in a solvent such as N-methyl-2-pyrrolidone to form paste-form cathode mixture slurry. Next, after the cathode mixture slurry is applied to the cathode current collector 21A, and the solvent is dried, the cathode mixture slurry is compression molded by a roller press or the like to form the cathode active material layer 21B, thereby the cathode 21 is obtained.

Next, the anode 22 is formed. More specifically, at first, after the anode active material including at least one of silicon and tin as an element, an electrical conductor and a binder are mixed to form an anode mixture, the anode mixture is dispersed in a solvent such as N-methyl-2-pyrrolidone to form paste-form anode mixture slurry. Next, the cathode mixture slurry is applied to the anode current collector 22A, and the solvent is dried, and then the anode mixture slurry is compression molded to form the anode active material layer 22B including the anode active material particles made of the above-described anode active material.

Next, an oxide-containing film including an oxide of at least one kind selected from the group consisting of silicon, germanium and tin is formed on a region in contact with the electrolytic solution of the surface of each anode active material particle, that is, a region except for a region in contact with the anode current collector 22A, the binder or other anode active material particles by a liquid-phase method. Thus, the oxide-containing film is formed by the liquid-phase method which has a superior substrate following capability, so the oxide-containing film is formed in the interior, which cannot be not covered with the oxide-containing film by a vapor-phase method, of the anode active material layer 22B. Moreover, the oxide-containing film formed by the liquid-phase method is a film having better properties than those of an oxide-containing film formed by air oxidation or the like. The reason of a difference in properties is unknown; however, it is considered that it is because of a difference in a film configuration such as the size of an oxide particle.

More specifically, as the liquid-phase method, the oxide-containing film is preferably formed by a liquid-phase deposition method, a coating method or a dip coating method. Among them, the liquid-phase deposition method is preferable. It is because in the liquid-phase deposition method, an oxide can be easily controlled to deposit the oxide-containing film.

Moreover, the oxide-containing film may be formed by a sol-gel method. In this case, a fluorine anion or a compound including fluorine and one kind selected from the group consisting of Group 13 to 15 elements (more specifically, a fluorine ion, a tetrafluoroborate ion, a hexafluorophosphate ion or the like) is preferably added to a treatment liquid as a reaction accelerator. It is because when such a reaction accelerator is used, hydrolysis reaction is accelerated, and the remaining amount of an alkoxy group in the formed oxide-containing film is reduced, and as a result, a gas generation amount in the battery is reduced, thereby swelling of the battery is prevented. As the reaction accelerator, more specifically, lithium hexafluorophosphate, lithium tetrafluorophosphate, hydrofluoric acid, lithium fluoride, sodium hexafluorophosphate, sodium tetrafluorophosphate, sodium fluoride, ammonium hexafluorophosphate, ammonium tetrafluorophosphate, ammonium fluoride or the like is cited. Moreover, as materials of the oxide-containing film by the sol-gel method, tetraethoxysilane, tetramethoxysilane, tetrapropoxysilane, tetraisopropoxysilane, tetrabutoxysilane, tetra-2-methoxyethoxysilane, di-secondary (sec)-butoxyaluminoxytriethoxysilane and an oligomer thereof are cited. Moreover, a mixture of them may be used. Alternatively, after these materials are hydrolyzed in a solution formed by adding water, and an acid (hydrochloric acid, sulfuric acid, nitric acid, acetic acid or the like) or an alkali (ammonia, lithium hydroxide or the like) as a catalyst, and the reaction accelerator in a solvent such as alcohol, the anode is immersed in and taken out of the solution, then the anode is dried. A series of processes including immersing, taking out and drying may be performed several times. Finally, the anode is fired at 150° C. to 1000° C., thereby the oxide-containing film is obtained.

After the oxide-containing film is formed so that the surfaces of the anode active material particles are selectively covered with the oxide-containing film, gaps between adjacent anode active material particles are filled with the metal including a metal element not alloyed with an electrode reactant by a liquid-phase method or the like. As the metal element, at least one kind selected from the group consisting of iron, cobalt, nickel, zinc and copper is used. Thereby, the anode 22 is obtained.

After the cathode 21 and the anode 22 are formed, the cathode lead 25 is attached to the cathode current collector 21A by welding or the like, and the anode lead 26 is attached to the anode current collector 22A by welding or the like. Next, the cathode 21 and the anode 22 are spirally wound with the separator 23 in between, and an end of the cathode lead 25 is welded to the safety valve mechanism 15, and an end of the anode lead 26 is welded to the battery can 11, and the cathode 21 and the anode 22 which are spirally wound are sandwiched between the pair of insulating plates 12 and 13, and they are contained in the battery can 11. After the cathode 21 and the anode 22 are contained in the battery can 11, the electrolytic solution is injected into the battery can 11 so as to impregnate the separator 23 with the electrolytic solution. After that, the battery cover 14, the safety valve mechanism 15 and the PTC device 16 are fixed in an opened end portion of the battery can 11 by caulking by the gasket 17. Thereby, the secondary battery shown in FIGS. 1 and 2 is completed.

When the secondary battery is charged, lithium ions are extracted from the cathode 21, and are inserted into the anode 22 through the electrolytic solution. When the secondary battery is discharged, the lithium ions are extracted from the anode 22 and are inserted into the cathode 21 through the electrolytic solution. At this time, the electrolytic solution seeps into the interior of the anode active material layer 22B; however, the oxide-containing film is formed on a region in contact with the electrolytic solution of the surface of each anode active material particle by the liquid-phase method, so the region in contact with the electrolytic solution of the surface of each anode active material particle are uniformly covered with the oxide-containing film, so chemical stability is increased. Therefore, the decomposition reaction of the electrolytic solution can be prevented, and charge-discharge efficiency can be improved.

Thus, in the embodiment, the oxide-containing film is formed by the liquid-phase method, so the region in contact with the electrolytic solution of the surface of each anode active material particle can be covered with the oxide-containing film, and the chemical stability of the anode 22 can be improved, and the charge-discharge efficiency can be improved.

Moreover, in the embodiment, the oxide-containing film is formed by the liquid-phase method having superior substrate following capability, so the oxide-containing film can be formed in the interior, which cannot be covered with the oxide-containing film by a vapor-phase method, of the anode active material layer 22B, and the anode 22 according to the embodiment can be easily formed.

In the embodiment, in the case where in the anode active material layer 22B, gaps between a plurality of adjacent anode active material particles are filled with the metal including a predetermined metal element not alloyed with an electrode reactant, the anode active material particles are firmly bonded by the metal, so the anode active material layer 22B resists being pulverized or falling from the anode current collector 22A. As a result, cycle characteristics can be improved.

Second Type Battery

Figure 3:
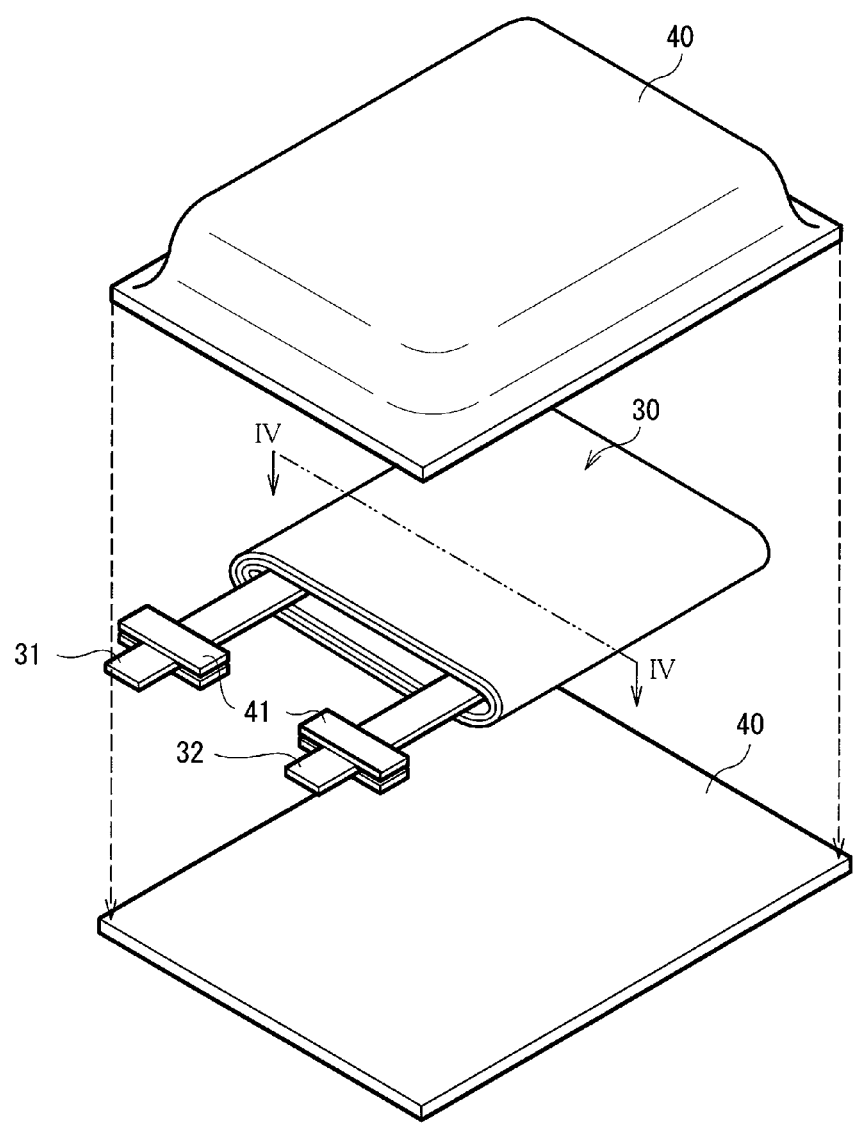
FIG. 3 is an exploded perspective view showing a second type secondary battery according to the first embodiment of the invention.

FIG. 3 shows the configuration of a second type secondary battery according to the embodiment. The secondary battery is a so-called laminate film type, and in the secondary battery, a spirally wound electrode body 30 to which a cathode lead 31 and an anode lead 32 are attached is contained in film-shaped package members 40.

The cathode lead 31 and the anode lead 32 are drawn from the interiors of the package members 40 to outside, for example, in the same direction. The cathode lead 31 and the anode lead 32 are made of, for example, a metal material such as aluminum, copper, nickel or stainless in a sheet shape or a mesh shape.

The package members 40 are made of, for example, a rectangular aluminum laminate film including a nylon film, aluminum foil and a polyethylene film which are bonded in this order. The package members 40 are disposed so that the polyethylene film of each of the package members 40 faces the spirally wound electrode body 30, and edge portions of the package members 40 are adhered to each other by fusion bonding or an adhesive. An adhesive film 41 is inserted between the package members 40 and the cathode lead 31 and the anode lead 32 for preventing the entry of outside air. The adhesive film 41 is made of, for example, a material having adhesion to the cathode lead 31 and the anode lead 32, for example, a polyolefin resin such as polyethylene, polypropylene, modified polyethylene or modified polypropylene.

In addition, the package members 40 may be made of a laminate film with any other configuration, a polymer film such as polypropylene or a metal film instead of the above-described aluminum laminate film.

Figure 4:
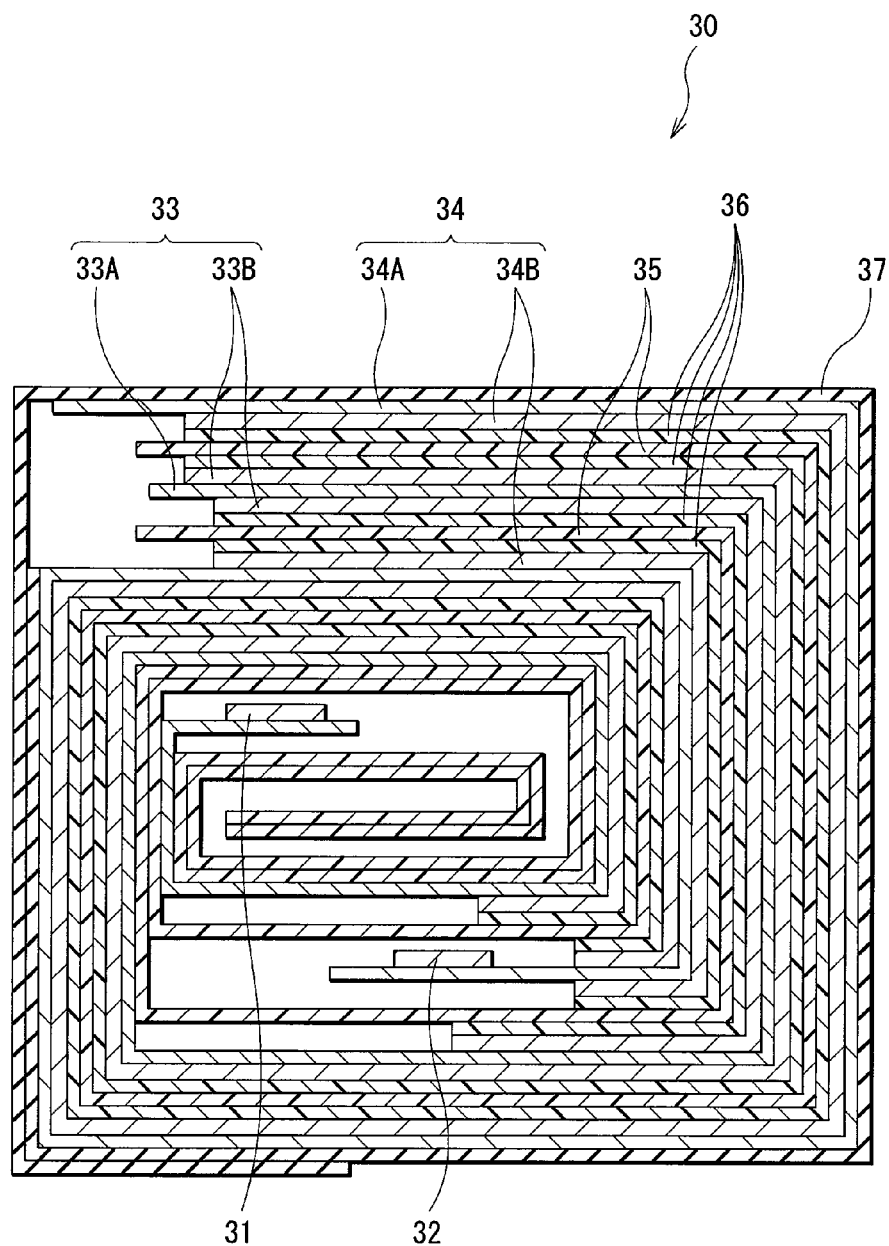
FIG. 4 is a sectional view showing a configuration of a spirally wound electrode body taken along a line IV-IV of FIG. 3.

FIG. 4 shows a sectional view of the spirally wound electrode body 30 taken along a line IV-IV of FIG. 3. The spirally wound electrode body 30 is a spirally wound laminate including a cathode 33 and an anode 34 with a separator 35 and an electrolyte layer 36 in between, and an outermost portion of the spirally wound electrode body 30 is protected with a protective tape 37.

The cathode 33 has a configuration in which a cathode active material layer 33B is arranged on both sides of a cathode current collector 33A. The configurations of the cathode current collector 33A and the cathode active material layer 33B are the same as those of the cathode current collector 21A and the cathode active material layer 21B in the first type battery.

The anode 34 has a configuration in which an anode active material layer 34B is arranged on both sides of an anode current collector 34A. The anode current collector 34A has the same configuration as the anode current collector 22A in the first type battery. The anode active material layer 34B includes anode active material particles made of the above-described anode active material as in the case of the anode active material layer 22B in the first type battery, and an oxide-containing film is formed on a region in contact with an electrolyte of the surface of each anode active material particle by a liquid-phase method. Thereby, in the secondary battery, as in the case of the first type battery, the chemical stability of the anode 34 can be improved, and the charge-discharge efficiency can be improved. The oxide-containing film includes an oxide of at least one kind selected from group consisting of silicon, germanium and tin as in the case of the oxide-containing film in the first type battery. The cathode 33 and the anode 34 are arranged so that the anode active material layer 34B and the cathode active material layer 33B face each other.

The separator 35 has the same configuration as the separator 23 in the first type battery.

The electrolyte layer 36 includes an electrolytic solution and a polymer compound as a holding body which holds the electrolytic solution, and is a so-called gel electrolyte. The gel electrolyte is preferable, because the gel electrolyte can obtain high ionic conductivity, and can prevent liquid leakage from the battery. The composition of the electrolytic solution is the same as that in the first embodiment. As the polymer compound, for example, an ether-based polymer compound such as polyethylene oxide or a cross-link including polyethylene oxide, an ester-based polymer compound such as polymethacrylate or an acrylate-based polymer compound, or a polymer of vinylidene fluoride such as polyvinylidene fluoride or a copolymer of vinylidene fluoride and hexafluoropropylene is cited, and one kind or a mixture of two or more kinds selected from them is used. More specifically, in terms of stability of oxidation-reduction, the fluorine-based polymer compound is preferably used.

The secondary battery can be manufactured by the following steps, for example.

At first, the cathode 33 and the anode 34 are formed by the same method as the above-described method of manufacturing the first type battery, and the electrolyte layer 36 is formed by applying a precursor solution including the electrolytic solution, the polymer compound and a mixture solvent to the cathode 33 and the anode 34, and volatilizing the mixture solvent. Next, the cathode lead 31 is attached to the cathode current collector 33A, and the anode lead 32 is attached to the anode current collector 34A. Next, after the cathode 33 on which the electrolyte layer 36 is formed and the anode 34 on which the electrolyte layer 36 is formed are laminated with the separator 35 in between to form a laminate, the laminate is spirally wound in a longitudinal direction, and the protective tape 37 is bonded to an outermost portion of the laminate so as to form the spirally wound electrode body 30. After that, for example, the spirally wound electrode body 30 is sandwiched between the package members 40, and edge portions of the package members 40 are adhered to each other by thermal fusion bonding or the like to seal the spirally wound electrode body 30 in the package members 40. At this time, the adhesive film 41 is inserted between the cathode lead 31, the anode lead 32 and the package members 40. Thereby, the secondary battery shown in FIGS. 3 and 4 is completed.

Moreover, the battery may be manufactured by the following steps. At first, after the cathode 33 and the anode 34 are formed by the same method as the above-described method of manufacturing the first type battery, and the cathode lead 31 and the anode lead 32 are attached to the cathode 33 and the anode 34, respectively, the cathode 33 and the anode 34 are laminated with the separator 35 in between to form a laminate, and the laminate is spirally wound, and the protective tape 37 is bonded to an outermost portion of the spirally wound laminate so as to form a spirally wound body as a precursor body of the spirally wound electrode body 30. Next, the spirally wound body is sandwiched between the package members 40, and the edge portions of the package members 40 except for one side are adhered by thermal fusion bonding to form a pouched package, thereby the spirally wound body is contained in the package members 40. An electrolytic composition which includes the electrolytic solution and monomers as materials of a polymer compound, and if necessary, any other material such as a polymerization initiator and a polymerization inhibitor is prepared, and the composition is injected in the package members 40, and then an opened portion of the package members 40 are sealed by thermal fusion bonding. After that, the monomers are polymerized by applying heat to form the Polymer compound, thereby the gel electrolyte layer 36 is formed. Thus, the secondary battery shown in FIGS. 3 and 4 is assembled.

The secondary battery functions in the same manner as that of the first type battery, and can obtain the same effects as those in the first type battery.

Second Embodiment

A secondary battery according to a second embodiment will be described below. The secondary battery according to the second embodiment has the same configuration, functions and effects as those in the first embodiment, and can be manufactured by the same method, except that the anodes 22 and 34 are formed by a vapor-phase method, a liquid-phase method or a firing method. Therefore, in the embodiment, FIGS. 1, 2, 3 and 4 are referred, and like components are denoted by like numerals as of the first embodiment, and will not be further described.

Figure 5:
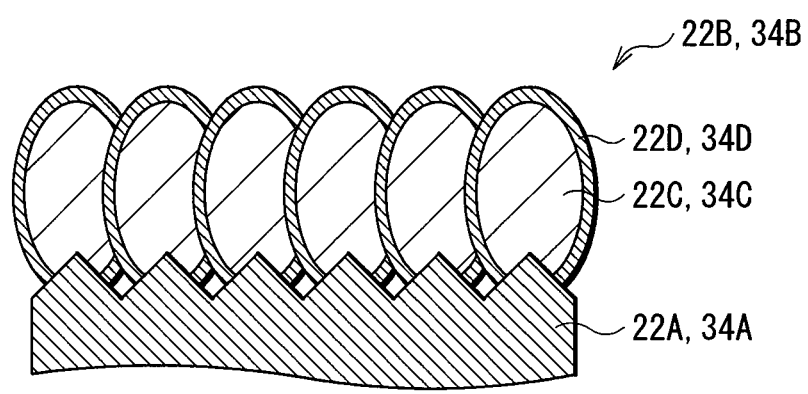
FIG. 5 is a schematic enlarged sectional view of a part of an anode of a secondary battery according to a second embodiment of the invention.

As in the case of the first embodiment, the anodes 22 and 34 have a configuration in which anode active material layers 22B and 34B are arranged on both sides of anode current collectors 22A and 34A, respectively. As in the case of the first embodiment, the anode active material layers 22B and 34B each include the anode active material including at least one of silicon and tin as an element. As in the case of the first embodiment, the anode active material layers 22B and 34B include anode active material particles 33C and 34C made of the above-described anode active material, respectively, and as shown in FIG. 5, in the anode active material particles 22C and 34C, oxide-containing films 22D and 34D are formed on a region in contact with the electrolytic solution or the electrolyte of the surface of each of the anode active material particles 22C and 34C by a liquid-phase method. Thereby, in the secondary battery, as in the case of the first embodiment, the chemical stability of the anodes 22 and 34 can be improved, and the charge-discharge efficiency can be improved.

Moreover, the anode active material layers 22B and 34B are formed by, for example, a vapor-phase method, a liquid-phase method or a firing method, or a combination of two or more methods selected from them, and the anode active material layers 22B and 34B and the anode current collectors 22A and 34A are preferably alloyed at least in a part of an interface therebetween. More specifically, it is preferable that the elements of the anode current collectors 22A and 34A are diffused into the anode active material layers 22B and 34B in the interface, respectively, or the elements of the anode active material layers 22B and 34B are diffused into the anode current collectors 22A and 34A in the interface, respectively, or they are diffused into each other in the interface. It is because a fracture in the anode active material layers 22B and 34B due to swelling and shrinkage thereof according to charge and discharge can be prevented, and electron conductivity between the anode active material layers 22B and 34B and the anode current collectors 22A and 34A can be improved.

As the vapor-phase method, for example, a physical deposition method or a chemical deposition method can be used, and more specifically, a vacuum deposition method, a sputtering method, an ion plating method, a laser ablation method, a thermal CVD (Chemical Vapor Deposition) method, a plasma chemical vapor deposition method, a spraying method or the like can be used. As the liquid-phase method, a known technique such as an electrolytic plating method or an electroless plating method can be used. The firing method is, for example, a method of mixing a particulate anode active material with a binder or the like to form a mixture, dispersing the mixture into a solvent, applying the solvent, and then carrying out a heat treatment at a higher temperature than the melting point of the binder or the like. As the firing method, a known technique such as, for example, an atmosphere firing method, a reaction firing method or a hot press firing method can be used.

Third Embodiment

A secondary battery according to a third embodiment of the invention will be described below. The secondary battery according to the third embodiment of the invention has the same configuration as that in the first embodiment, except for a part of the configurations of the anodes 22 and 34. Therefore, in the embodiment, FIGS. 1, 2, 3 and 4 are referred, and like components are denoted by like numerals as of the first embodiment, and will not be further described.

As in the case of the first embodiment, the anodes 22 and 34 have a configuration in which the anode active material layers 22B and 34B are arranged on both sides of the anode current collectors 22A and 34A having a pair of facing surfaces, respectively. The anode active material layers 22B and 34B each include the same anode active material as that in the first embodiment.

In the embodiment, a coating film including an oxide of at least one kind selected from silicon, germanium and tin, and a halide of at least one kind selected from silicon, germanium and tin is arranged in at least a part of a surface of the anode active material. Thereby, the chemical stability of the anode 22 can be improved, and the decomposition of the electrolytic solution can be prevented, and the charge-discharge efficiency can be improved. In the case where the anode active material layers 22B and 34B include a plurality of anode active material particles made of the above-described anode active material, the coating film may be formed so that the anode active material particles are covered with the coating film, or the coating film may be formed only on the surfaces of the anode active material layer 22B and 34B, or the coating film may be formed on the surfaces of the anode active material layers 22B and 34B as well as between the anode active material particles.

As the halide, a fluoride is preferable. It is because lithium fluoride is formed at the time of charge and discharge, and the surfaces of the anodes 22 and 34 are covered with lithium fluoride, thereby the surfaces of the anodes 22 and 34 can be further stabilized.

Moreover, the coating film can be formed by, for example, a liquid-phase deposition method, an electrodeposition method, a coating method, a dip coating method, an evaporation method, a sputtering method, a CVD (Chemical Vapor Deposition) method, a sol-gel method or the like.

Among them, the coating film is preferably formed by the liquid-phase deposition method. It is because by the method, the deposition of the coating film can be easily controlled. The liquid-phase deposition method is, for example, a method of depositing an oxide and a halide on the surfaces of the anode active material layers 22B and 34B to form the coating film by adding a dissolved species which easily coordinates fluorine (F) as an anion trapping agent to a solution of a fluoride complex of silicon, tin or germanium to mix them, and immersing the anode current collectors 22A and 34A on which the anode active material layers 22B and 34B are formed in the mixture, and then trapping a fluorine anion generated from the fluoride complex by the dissolved species. Instead of the fluoride complex, for example, a silicon compound, a tin compound or a germanium compound generating another anion such as a sulfate ion may be used. Moreover, in the case where the coating film is formed by the sol-gel method, a treatment liquid including a fluorine anion, or a compound including fluorine and one kind selected from the group consisting of Group 13 to 15 elements (more specifically, a fluorine ion, a tetrafluoroborate ion, a hexafluorophosphate ion or the like) as a reaction accelerator may be used. It is because in the coating film obtained by such a manner, the content of an alkoxy group is low, and a gas generation amount in the case where the coating film functions as an anode in an electrochemical device such as a battery is reduced.

In the anode active material layers 22B and 34B, a metal (for example, a plating film) including a metal element not alloyed with an electrode reactant is preferably arranged so that the anode active material layers 22B and 34B are fixed to at least one of the surface of the anode active material and the surface of the coating film. As the metal element in this case, at least one kind selected from the group consisting of iron (Fe), cobalt (Co), nickel (Ni), zinc (Zn) and copper (Cu) is cited.

Such a metal can reduce the surface area of the anode active material, and can prevent the formation of an irreversible coating film which may be a potential impediment to the progress of the electrode reaction. For example, in the case where the anode active material particles are formed by a vapor-phase method, beard-like fine projections are formed on the surfaces, so a large number of gaps between the projections are formed. The gaps cause an increase in the surface area of the anode active material; however, when the above-described metal is arranged in advance, in the case where the metal functions as an anode in an electrochemical device such as a battery, the irreversible film formed on the surfaces of the anode active material particles is reduced.

Moreover, in the case where the anode active material layers 22B and 34B each include a plurality of anode active material particles made of the anode active material, it is desired to arrange the above-described metal in gaps between the adjacent anode active material particles. In this case, the metal may be arranged in gaps between the anode active material particles covered with the coating film, or in gaps between the anode active materials particles not covered with the coating film. In the latter case, the coating film may be arranged so that both of the anode active material particles and the metal arranged in the gaps are covered with the coating film. In such a configuration, the bonding property between the anode active materials is improved, and the contact between the anode active material and the electrolytic solution is prevented, so the decomposition of the electrolytic solution is prevented. Moreover, to improve the bonding property, it is desired to sufficiently fill the gaps between the adjacent anode active material particles with the metal. In this case, a part of gaps may be filled with the metal; however, the more filling amount of the metal is more preferable. It is because the bonding property of the anode active material layers 22B and 34B is further improved.

Further, the anode active material layers 22B and 34B each have a larger formation area than the cathode active material layers 21B and 33B. In other words, the anode active material layers 22B and 34B each include a facing portion facing the cathode active material layers 21B and 33B and a surplus portion positioned so as to surround the facing portion (a portion extending off and not facing the cathode active material layers 21B and 33B). In such a configuration, the areas of the anodes 22 and 34 which are supposed to receive lithium ions emitted from the cathode 21 during charge is sufficiently secured, so an increase in the current density in ends of the anode active material layers 22B and 34B can be prevented, and the dendrite deposition of metal lithium can be prevented. In this case, the coating film may be arranged also on the surface of the anode active material in the surplus portions of the anode active material layers 22B and 34B. It is because even in the case where the positions where the cathode active material layers 21B and 33B and the anode active material layers 22B and 34B face each other are shifted by repeating charge and discharge, an effect (which will be described later) by the above-described coating film can be obtained.

The secondary battery can be manufactured as in the case of the first embodiment, except that the anodes 22 and 34 are formed by the following steps, for example.

The anodes 22 and 34 are formed by the following steps. More specifically, at first, after the anode active material including at least one of silicon and tin as an element, an electrical conductor and a binder are mixed to form an anode mixture, the anode mixture is dispersed in a solvent such as N-methyl-2-pyrrolidone to form paste-form anode mixture slurry. Next, the anode active material layers 22B and 34B are formed by applying the anode mixture slurry to the anode current collectors 22A and 34B, and drying and compression molding the anode mixture slurry. Next, a coating film including an oxide of at least one kind selected from silicon, germanium and tin and a halide of at least one kind selected from silicon, germanium and tin is formed on the surface of the anode active material constituting the anode active material layers 22B and 34B by the above-described method, thereby the anodes 22 and 34 are obtained.

In this case, in the case where the coating film is formed by a sol-gel method, a compound including tetrafluoroborate ion, a hexafluorophosphate ion or a fluorine ion is preferably added to a treatment liquid as a reaction accelerator. It is because when such a reaction accelerator is used, hydrolysis reaction is accelerated, and the remaining amount of an alkoxy group in the formed coating film is reduced, and as a result, a gas generation amount in the battery is reduced. As the reaction accelerator, more specifically, lithium hexafluorophosphate, lithium tetrafluorophosphate, hydrofluoric acid, lithium fluoride, sodium hexafluorophosphate, sodium tetrafluorophosphate, sodium fluoride, ammonium hexafluorophosphate, ammonium tetrafluorophosphate, ammonium fluoride or the like is cited. Moreover, as materials of the oxide-containing film by the sol-gel method, tetraethoxysilane, tetramethoxysilane, tetrapropoxysilane, tetraisopropoxysilane, tetrabutoxysilane, tetra-2-methoxyethoxysilane, di-secondary (sec)-butoxyaluminoxytriethoxysilane, and an oligomer thereof are cited. Alternatively, a mixture of them may be used. After these materials are hydrolyzed in a solution formed by adding water, and an acid (hydrochloric acid, sulfuric acid, nitric acid, acetic acid or the like) or an alkali (ammonia, lithium hydroxide or the like) as a catalyst, and the reaction accelerator in a solvent such as alcohol, the anode is immersed in and taken out of the solution, and then the anode is dried. A series of processes including immersing, taking out and drying may be performed several times. Finally, the anode is fired at 150° C. to 1000° C. to obtain the coating film.

Moreover, after or before the coating film is formed on the anode active material, a metal including a metal element not alloyed with an electrode reactant may be formed by a liquid-phase method or the like so as to firmly bond to the surface of the anode active material or the surface of the coating film. As the gold element, at least one kind selected from the group consisting of iron, cobalt, nickel, zinc and copper is used.

When the secondary battery is charged, lithium ions are extracted from the cathode 21 or 33, and are inserted into the anode 22 or 34 through the electrolytic solution. At this time, the coating film including an oxide of at least one kind selected from the group consisting of silicon, germanium and tin and a halide of at least one kind selected from the group consisting of silicon, germanium and tin is formed on at least a part of the surface of the anode active material, so the chemical stability of the anodes 22 and 34 is improved, and the decomposition reaction of the electrolytic solution is prevented. The possibility that fluorine in the electrolytic solution forms a coating film of a fluoride on the surface of the anode active material by repeating charge and discharge is considered; however, in this case, the decomposition reaction of the electrolytic solution occurs at the time of forming the coating film. In the embodiment, the above-described coating film is formed in advance in a manufacturing step, so the decomposition reaction of the electrolytic solution can be prevented even in a step of performing an initial charge-discharge cycle.

Thus, in the secondary battery according to the embodiment, the coating film including an oxide of at least one kind selected from the group consisting of silicon, germanium and tin and a halide of at least one kind selected from the group consisting of silicon, germanium and tin is arranged on at least a part of the surface of the anode active material, so the chemical stability can be improved, and charge-discharge efficiency can be improved.

Moreover, when the metal including a metal element not alloyed with an electrode reactant is formed by a liquid-phase method or the like so as to be firmly bonded to the surface of the anode active material or the surface of the coating film after or before the coating film is formed on the surface of the anode active material, the surface area of the anode active material can be reduced, and the formation of the irreversible coating film which may be a potential impediment to the progress of the electrode reaction can be prevented.

In particular, in the case where the anode active material layers 22B and 34B each include a plurality of anode active material particles, when the metal including an metal element not alloyed with the electrode reactant is formed in gaps between adjacent anode active material particles by a liquid-phase method or the like after or before the coating film is formed on the surfaces of the anode active material particles, the anode active material particles are firmly bonded to one another by the metal, so the anode active material layers 22B and 34B resist being pulverized or falling from the anode current collectors 22A and 34A. As a result, cycle characteristics can be improved.

Fourth Embodiment

A secondary battery according to a fourth embodiment has the same configuration, functions and effects as those in the third embodiment, and can be manufactured by the same method as in the case of the third embodiment, except that the configurations of the anodes 22 and 34 are partially different. Therefore, in the embodiment, FIGS. 1, 2, 3 and 4 are referred, and like components are denoted by like numerals as of the third embodiment, and will not be further described.

The anodes 22 and 34 have a configuration in which the anode active material layers 22B and 34B are arranged on both sides of the anode current collectors 22A and 34B, respectively, and the anode active material layers 22B and 34B each include an anode active material including at least one of silicon and tin as an element as in the case of the third embodiment, and a coating film including an oxide of at least one kind selected from the group consisting of silicon, germanium and tin and a halide of at least one kind selected from the group consisting of silicon, germanium and tin is arranged on at least a part of a surface of the anode active material. More specifically, the anode active material includes the simple substance, an alloy and a compound of silicon, and the simple substance, an alloy and a compound of tin, and the anode active material may include two or more kinds selected from them.

Moreover, the anode active material layers 22B and 34B are formed by, for example, a vapor-phase method, a liquid-phase method or a firing method, or a combination of two or more methods selected from them, and the anode active material layers 22B and 34B and the anode current collectors 22A and 34A are preferably alloyed at least in a part of an interface therebetween. More specifically, it is preferable that the elements of the anode current collectors 22A and 34A are diffused into the anode active material layers 22B and 34B, respectively, or the elements of the anode active material layers 22B and 34B are diffused into the anode current collectors 22A and 34A, respectively, or they are diffused into each other in the interface. It is because a fracture in the anode active material layers 22B and 34B due to swelling and shrinkage thereof according to charge and discharge can be prevented, and the electron conductivity between the anode active material layers 22B and 34B and the anode current collectors 22A and 34A can be improved.

As the vapor-phase method, for example, a physical deposition method or a chemical deposition method can be used, and more specifically, a vacuum deposition method, a sputtering method, an ion plating method, a laser ablation method, a thermal CVD (Chemical Vapor Deposition) method, a plasma chemical vapor deposition method, a spraying method or the like can be used. As the liquid-phase method, a known technique such as an electrolytic plating method or an electroless plating method can be used. The firing method is, for example, a method of mixing a particulate anode active material with a binder or the like to form a mixture, dispersing the mixture into a solvent, applying the solvent, and then carrying out a heat treatment at a higher temperature than the melting point of the binder or the like. As the firing method, a known technique such as, for example, an atmosphere firing method, a reaction firing method or a hot press firing method can be used.

EXAMPLES

Specific examples of the invention will be described in detail below.

Examples 1-1 to 1-7

Figure 6:
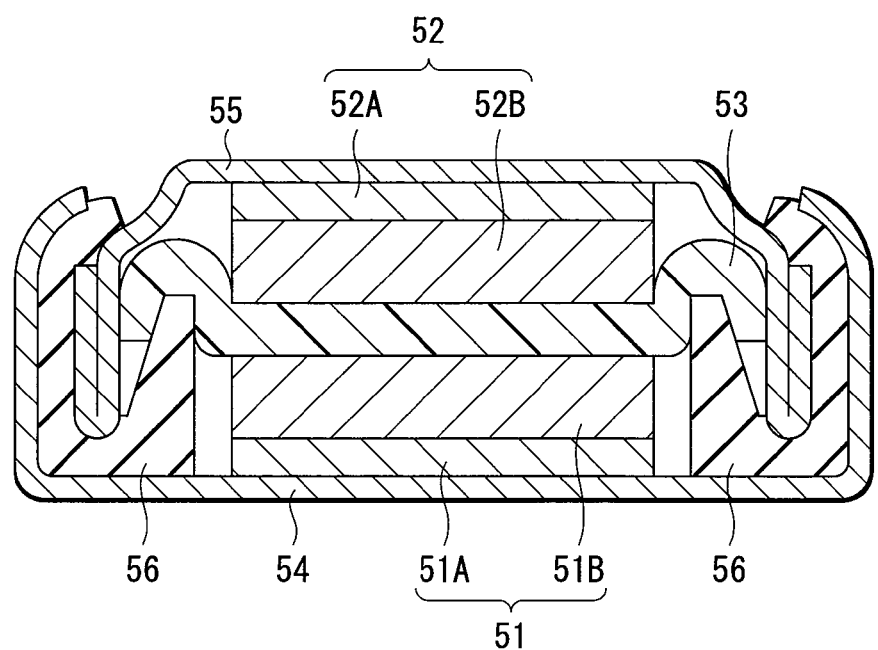
FIG. 6 is a sectional view showing a configuration of a secondary battery formed in examples.

Coin type secondary batteries shown in FIG. 6 were formed. The secondary batteries had a configuration in which a cathode 51 and an anode 52 were laminated with a separator 53 impregnated with an electrolytic solution in between, and they were sandwiched between a package can 54 and a package cup 55, and the package can 54 and the package cup 55 were caulked by a gasket 56.

At first, after an anode active material layer 52B was formed on an anode current collector 52A made of copper foil with a thickness of 10 μm by evaporating silicon by an electron beam evaporation method, the anode current collector 52A on which the anode active material layer 52B was formed was stamped into a pellet with a diameter of 16 mm.

Figure 7:
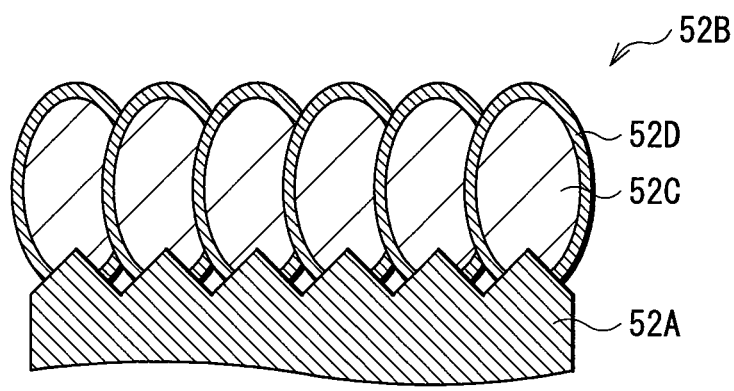
FIG. 7 is a schematic enlarged sectional view of a part of an anode shown in FIG. 6.

Next, in Examples 1-1 to 1-5, the anode current collector 52A on which the anode active material layer 52B was formed was immersed in a solution formed by dissolving boric acid as an anion trapping agent in hexafluorosilicic acid as a fluoride complex, thereby as shown in FIG. 7, an oxide-containing film 52D made of silicon oxide ($SiO_2$) was deposited on a region in contact with the electrolytic solution of the surface of each anode active material particle 52C made of silicon. At that time, the concentrations of hexafluorosilicic acid and boric acid were 2 mol/dm$^3$ and 0.028 mol/dm$^3$, respectively. Moreover, the immersing time was 1 hour in Example 1-1, 2 hours in Example 1-2, 3 hours in Example 1-3, 6 hours in Example 1-4, and 21 hours in Example 1-5. After that, the anode current collector 52A was cleaned with water, and dried under reduced pressure to form the anode 52.

Moreover, in Example 1-6, the anode current collector 52A on which the anode active material layer 52B was immersed in a solution formed by dissolving aluminum chloride as an anion trapping agent in hexafluorostannic acid as a fluoride complex so as to deposit the oxide-containing film 52D made of tin oxide on a region in contact with the electrolytic solution of the surface of each anode active material particle 52C made of silicon. At that time, the concentrations of hexafluorostannic acid and aluminum chloride were 0.17 mol/dm$^3$ and 0.07 mol/dm$^3$, respectively, and the immersing time was 3 hours. After that, the anode current collector 52A was cleaned with water, and dried under reduced pressure to form the anode 52.

In Example 1-7, the anode current collector 52A on which the anode active material layer 52B was formed was immersed in a solution formed by dissolving aluminum chloride as an anion trapping agent in hexafluorogermanic acid as a fluoride complex to deposit the oxide-containing film 52D made of germanium oxide on a region in contact with the electrolytic solution of the surface of each anode active material particles 52C made of silicon. At that time, the concentrations of hexafluorogermanic acid and aluminum chloride were 0.17 mol/dm$^3$ and 0.05 mol/dm$^3$, respectively, and the immersing time was 3 hours. After that, the anode current collector 52A was cleaned with water, and dried under reduced pressure to form the anode 52.

The thickness of the oxide-containing film 52D in each example was examined through the use of the formed anode 52 by an SEM (Scanning Electron Microscope). The results are shown in Table 1. Moreover, when the oxide-containing films 52D were observed, it was confirmed that the oxide-containing films 52D were formed in the interiors, which could not be covered by a vapor-phase method, of the anode active material layers 52B.

made of aluminum foil with a thickness of 20 μm, and was dried, the cathode mixture slurry was compression molded to form a cathode active material layer 51B. After that, the cathode current collector 51A on which the cathode active material layer 51B was formed was stamped into a pellet with a diameter of 15.5 nm to form the cathode 51.

Next, after the formed cathode 51 and the formed anode 52 were positioned in the package can 54 with the separator 53 made of a microporous polypropylene film in between, and the electrolytic solution was injected onto the cathode 51 and the anode 52, and the package cup 55 was put onto the package can 54, and they were sealed by caulking. As the electrolytic solution, an electrolytic solution formed by dissolving 1 mol/dm$^3$ of lithium hexafluorophosphate as an electrolyte salt in a solvent formed by mixing 4-fluoro-1,3-dioxolane-2-one and diethyl carbonate at a weight ratio of 1:1 was used.

Figure 8:
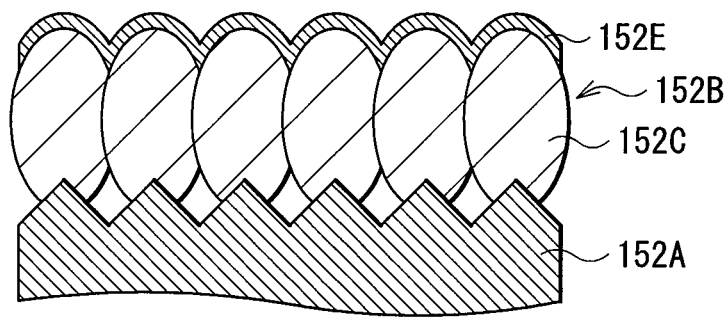
FIG. 8 is a schematic enlarged sectional view of a part of an anode active material layer formed in Comparative Example 1-2.

As Comparative Example 1-1 relative to Examples 1-1 to 1-7, a secondary battery was formed as in the case of Examples 1-1 to 1-7, except that the oxide-containing film was not arranged. Moreover, as Comparative Example 1-2, a secondary battery was formed as in the case of Examples 1-1 to 1-7, except that an anode which was formed by forming the anode active material layer by evaporating silicon on the anode current collector by an electron beam evaporation method, and then laminating a coating film 152E made of silicon oxide with a thickness of 50 nm by a vapor-phase method as shown in FIG. 8 was used. When the anode obtained in Comparative Example 1-2 was observed, it was confirmed that the coating film 152E was formed only on the

TABLE 1

Battery shape: coin type
Anode active material: silicon (electron beam evaporation)

|  | OXIDE-CONTAINING FILM | MATERIAL | FORMING METHOD | IMMERSING TIME (HOUR) | THICKNESS (nm) | DISCHARGE CAPACITY RETENTION RATIO (%) |
|---|---|---|---|---|---|---|
| EXAMPLE 1-1 | PRESENT | SILICON OXIDE | LIQUID-PHASE | 1 | 20 | 85 |
| EXAMPLE 1-2 | PRESENT | SILICON OXIDE | LIQUID-PHASE | 2 | 30 | 92 |
| EXAMPLE 1-3 | PRESENT | SILICON OXIDE | LIQUID-PHASE | 3 | 40 | 92 |
| EXAMPLE 1-4 | PRESENT | SILICON OXIDE | LIQUID-PHASE | 6 | 50 | 93 |
| EXAMLPE 1-5 | PRESENT | SILICON OXIDE | LIQUID-PHASE | 21 | 100 | 92 |
| EXAMPLE 1-6 | PRESENT | TIN OXIDE | LIQUID-PHASE | 3 | 20 | 91 |
| EXAMPLE 1-7 | PRESENT | GERMANIUM OXIDE | LIQUID-PHASE | 3 | 20 | 91 |
| COMPARATIVE EXAMPLE 1-1 | ABSENT | — | — | — | — | 76 |
| COMPARATIVE EXAMPLE 1-2 | PRESENT | SILICON OXIDE | VAPOR-PHASE | — | 50 | 76 |

Moreover, lithium carbonate (Li$_2$CO$_3$) and cobalt carbonate (CoCO$_3$) were mixed at a molar ratio of Li$_2$CO$_3$:CoCO$_3$=0.5:1, and the mixture was fired in air at 900° C. for 5 hours to obtain lithium cobalt complex oxide (LiCoO$_2$). Next, after 91 parts by weight of the lithium cobalt complex oxide, 6 parts by weight of graphite as an electrical conductor and 3 parts by weight of polyvinylidene fluoride as a binder were mixed to form a cathode mixture, the cathode mixture was dispersed in N-methyl-2-pyrrolidone as a solvent to form cathode mixture slurry. Next, after the cathode mixture slurry was uniformly applied to a cathode current collector 51A top surface of the anode active material layer 152B, and the surfaces of anode active material particles 152C in the interior of the anode active material layer 152B were exposed.

The cycle characteristics of the formed secondary batteries of Examples 1-1 to 1-7 and Comparative Examples 1-1 and 1-2 were determined. The cycle characteristics were determined by performing 100 cycles of charge and discharge at 23° C., and then determining the discharge capacity retention ratio (%) in the 100th cycle in the case where the discharge capacity in the second cycle was 100. At that time, after the secondary batteries were charged at a constant current density of 1 mA/cm² until the battery voltage reached 4.2 V, the secondary batteries were charged at a constant voltage of 4.2 V until the current density reached 0.02 mA/cm², and the secondary batteries were discharged at a constant current density of 1 mA/cm² until the battery voltage reached 2.5 V. The results are shown in Table 1.

As shown in Table 1, in Examples 1-1 to 1-7 in which the oxide-containing film 52D was formed by a liquid-phase method, the discharge capacity retention ratio was improved, compared to Comparative Example 1-1 in which the oxide-containing film was not formed and Comparative Example 1-2 in which the coating film 152E was laminated on the anode active material layer 152B by a vapor-phase method. In other words, it was found out that when the oxide-containing film 52D made of silicon oxide, tin oxide or germanium oxide was formed on the anode active material layer 52B by a liquid-phase method, the cycle characteristics could be improved.

Examples 2-1 to 2-5

At first, 90 wt % of silicon powder with an average particle diameter of 1 μm as an anode active material and 10 wt % of polyvinylidene fluoride as a binder were mixed to form a mixture, and the mixture was dispersed in N-methyl-2-pyrrolidone as a solvent to form anode mixture slurry. Next, after the anode mixture slurry was uniformly applied to the anode current collector 52A made of copper foil with a thickness of 18 μm, and the anode mixture slurry was dried and compressed, the anode mixture slurry was heated for 12 hours at 400° C. in a vacuum atmosphere to form the anode active material layer 52B, and the anode current collector 52A on which the anode active material layer 52B was formed was stamped into a pellet with a diameter of 16 mm. Next, the anode current collector 52A on which the anode active material layer 52B was formed was immersed in a solution formed by dissolving boric acid in hexafluorosilicic acid as in the case of Examples 1-1 to 1-5, thereby the oxide-containing film made of silicon oxide ($SiO_2$) was deposited on a region in contact with the electrolytic solution of the surface of each anode active material particle made of silicon. At that time, the concentrations of hexafluorosilicic acid and boric acid were 2 mol/dm³ and 0.028 mol/dm³, respectively. The immersing time was 1 hour in Example 2-1, 2 hours in Example 2-2, 3 hours in Example 2-3, 6 hours in Exhale 2-4 and 21 hours in Example 2-5. After that, the anode current collector 52A was cleaned with water, and dried under reduced pressure to form the anode 52.

After the anode 52 was formed, secondary batteries using the anode 52 were formed as in the case of Examples 1-1 to 1-5.

As Comparative Example 2-1 relative to Examples 2-1 to 2-5, a secondary battery was formed as in the case of Examples 2-1 to 2-5, except that the oxide-containing film was not arranged. Moreover, as Comparative Example 2-2, a secondary battery was formed as in the case of Examples 2-1 to 2-5, except a coating film made of silicon oxide was formed by heating silicon powder with an average particle diameter of 1 μm at 300° C. in an argon gas including 5% of oxygen to oxidize the silicon powder, and the anode was formed through the use of the powder. When the anode obtained in Comparative Example 2-2 was observed by an SEM, the coating film was not observed, and the thickness thereof was unknown. Therefore, it was considered that the configuration of a film formed by a liquid-phase method was different from that of a film formed by a vapor-phase method.

The cycle characteristics of the formed secondary batteries of Examples 2-1 to 2-5 and Comparative Examples 2-1 and 2-2 were determined as in the case of Examples 1-1 to 1-7. The results are shown in Table 2.

TABLE 2

Battery shape: coin type
Anode active material: silicon (coating)

| | OXIDE-CONTAINING FILM | MATERIAL | FORMING METHOD | IMMERSING TIME (HOUR) | THICKNESS (nm) | DISCHARGE CAPACITY RETENTION RATIO (%) |
|---|---|---|---|---|---|---|
| EXAMPLE 2-1 | PRESENT | SILICON OXIDE | LIQUID-PHASE | 1 | 20 | 70 |
| EXAMPLE 2-2 | PRESENT | SILICON OXIDE | LIQUID-PHASE | 2 | 30 | 71 |
| EXAMPLE 2-3 | PRESENT | SILICON OXIDE | LIQUID-PHASE | 3 | 40 | 71 |
| EXAMPLE 2-4 | PRESENT | SILICON OXIDE | LIQUID-PHASE | 6 | 50 | 70 |
| EXAMLPE 2-5 | PRESENT | SILICON OXIDE | LIQUID-PHASE | 21 | 100 | 71 |
| COMPARATIVE EXAMPLE 2-1 | ABSENT | — | — | — | — | 69 |
| COMPARATIVE EXAMPLE 2-2 | PRESENT | SILICON OXIDE | THERMAL OXIDATION | — | — | 65 |

As shown in Table 2, the same results as those in Examples 1-1 to 1-5 were obtained. More specifically, it was found out that in the case where the oxide-containing film made of silicon oxide was formed on a region in contact with the electrolytic solution of the surface of each anode active material particle including silicon as an element by a liquid-phase method, even if the method of forming the anode active material layer 52B was changed, the cycle characteristics could be improved.

Examples 3-1 to 3-3

80 parts by weight of the SnCoC-containing material as an anode active material, 11 parts by weight of graphite and 1 part by weight of acetylene black as electrical conductors and 8 parts by weight of polyvinylidene fluoride as a binder were mixed to form a mixture, and the mixture was dispersed in N-methyl-2-pyrrolidone as a solvent to form anode mixture slurry. Next, after the anode mixture slurry was uniformly applied to the anode current collector 52A made of copper foil with a thickness of 10 µm, and was dried, the anode mixture slurry was compression molded to form the anode active material layer 52B, and the anode current collector 52A on which the anode active material layer 52B was formed was stamped into a pellet with a diameter of 16 mm. Next, the anode current collector 52A on which the anode active material layer 52B was formed was immersed in a solution formed by dissolving boric acid in hexafluorosilicic acid as in the case of Examples 1-1 to 1-5 to deposit the oxide-containing film made of silicon oxide ($SiO_2$) on a region in contact with the electrolytic solution of the surface of each anode active material particle made of the SnCoC-containing material. At that time, the concentrations of hexafluorosilicic acid and boric acid were 0.1 mol/$dm^3$ and 0.028 mol/$dm^3$, respectively. The immersing time was 1 hour in Example 3-1, 3 hours in Example 3-2, and 6 hours in Example 3-3. After that, the anode current collector 52A was cleaned with water, and dried under reduced pressure to form the anode 52.

Figure 9:
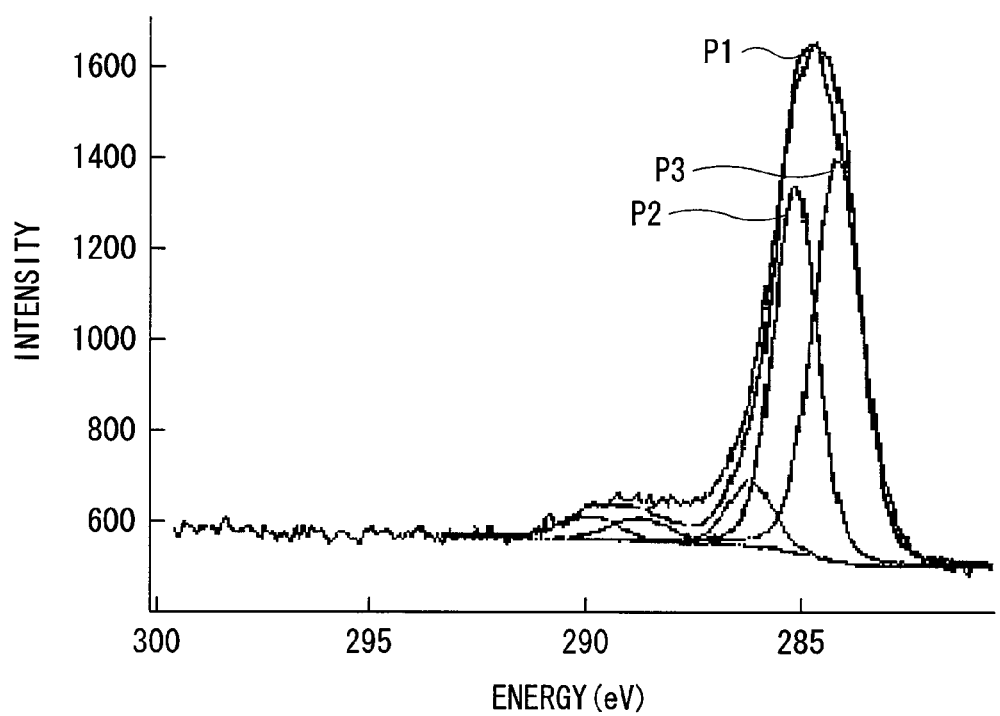
FIG. 9 is an illustration showing an example of peaks obtained by X-ray photoelectron spectroscopy relating to a SnCoC-containing material formed in an example.

The SnCoC-containing material was synthesized by mixing tin-cobalt-indium alloy powder and carbon powder, and inducing a mechanochemical reaction between them. When the composition of the obtained SnCoC-containing material was analyzed, the tin content was 48 wt %, the cobalt content was 23 wt %, and the carbon content was 20 wt %, and the ratio of cobalt to the total of tin and cobalt Co/(Sn+Co) was 32.4 wt %. The carbon content was measured by a carbon/sulfur analyzer, and the contents of tin and cobalt were measured by ICP (Inductively Coupled Plasma) emission spectrometry. Moreover, when X-ray diffraction was performed on the obtained SnCoC-containing material, a diffraction peak having a broad half-width in which the diffraction angle 2θ was 1.0° or more was observed within a range of the diffraction angle 2θ=20° to 50°. Further, when the XPS measurement was performed on the obtained SnCoC-containing material, the peak P1 shown in FIG. 9 was obtained. When the peak P1 was analyzed, a peak P2 of surface contamination carbon and a peak P3 of C1s in the SnCoC-containing material on a lower energy side than the peak P2 were obtained. The peak P3 was obtained in a region lower than 284.5 eV. In other words, it was confirmed that carbon included in the SnCoC-containing material was bonded to another element.

After the anode 52 was formed, secondary batteries were formed through the use of the anode 52 as in the case of Examples 1-1 to 1-5.

As Comparative Example 2-1 relative to Examples 3-1 to 3-3, a secondary battery was formed as in the case of Examples 3-1 to 3-3, except that the oxide-containing film was not arranged.

The cycle characteristics of the formed secondary batteries of Examples 3-1 to 3-3 and Comparative Example 3-1 were determined. The results are shown in Table 3.

TABLE 3

Battery shape: coin type
Anode active material: SnCoC-containing material

| | OXIDE-CONTAINING FILM | MATERIAL | FORMING METHOD | IMMERSING TIME (HOUR) | THICKNESS (nm) | DISCHARGE CAPACITY RETENTION RATIO (%) |
|---|---|---|---|---|---|---|
| EXAMPLE 3-1 | PRESENT | SILICON OXIDE | LIQUID-PHASE | 1 | 30 | 91 |
| EXAMPLE 3-2 | PRESENT | SILICON OXIDE | LIQUID-PHASE | 3 | 50 | 92 |
| EXAMLPE 3-3 | PRESENT | SILICON OXIDE | LIQUID-PHASE | 6 | 100 | 91 |
| COMPARATIVE EXAMPLE 3-1 | ABSENT | — | — | — | — | 90 |

As shown in Table 3, the same results as those in Examples 1-1 to 1-5 were obtained. More specifically, it was found out that when the oxide-containing film made of silicon oxide was formed on a region in contact with the electrolytic solution of the surface of each anode active material particle including tin as an element by a liquid-phase method, the cycle characteristics could be improved.

Examples 4-1 to 4-3

Cylindrical type secondary batteries shown in FIGS. 1 and 2 were formed. At that time, the cathode 21 and the anode 22 were formed as in the case of Examples 1-1, 1-3 and 1-4. The anode 22 was formed by forming the anode active material layer 22B made of silicon by an electron beam evaporation method, and then forming the oxide-containing film made of silicon oxide. As the separator 23, a microporous polypropylene film with a thickness of 25 µm was used, and the electrolytic solution was the same as that in Examples 1-1 to 1-7.

As Comparative Example 4-1 relative to Examples 4-1 to 4-3, a secondary battery was formed as in the case of Examples 4-1 to 4-3, except that the oxide-containing film was not arranged.

The cycle characteristics of the formed secondary batteries of Examples 4-1 to 4-3 and Comparative Example 4-1 were determined as in the case of Examples 1-1 to 1-7. The results are shown in Table 4.

TABLE 4

Battery shape: cylindrical type
Anode active material: silicon (electron beam evaporation)

| | OXIDE-CONTAINING FILM | MATERIAL | FORMING METHOD | IMMERSING TIME (HOUR) | THICKNESS (nm) | DISCHARGE CAPACITY RETENTION RATIO (%) |
|---|---|---|---|---|---|---|
| EXAMPLE 4-1 | PRESENT | SILICON OXIDE | LIQUID-PHASE | 1 | 20 | 83 |
| EXAMPLE 4-2 | PRESENT | SILICON OXIDE | LIQUID-PHASE | 3 | 40 | 85 |
| EXAMLPE 4-3 | PRESENT | SILICON OXIDE | LIQUID-PHASE | 6 | 50 | 88 |
| COMPARATIVE EXAMPLE 4-1 | ABSENT | — | — | — | — | 74 |

As shown in Table 4, the same results as those in Examples 1-1 to 1-5 were obtained. More specifically, it was found out that even in the case of a secondary battery with another shape, when the oxide-containing film made of silicon oxide was arranged on a region in contact with the electrolytic solution of the surface of each anode active material particle including at least one of silicon and tin as an element by a liquid-phase method, the cycle characteristics could be improved.

Examples 5-1 to 5-3

Laminate film type secondary batteries shown in FIGS. 3 and 4 were formed. At first, the cathode 33 and the anode 34 were formed as in the case of Examples 1-1, 1-3 and 1-4. The anode 34 was formed by forming the anode active material layer 34B made of silicon by an electron beam evaporation method, and then forming the oxide-containing film made of silicon oxide.

Next, an electrolytic solution was formed by mixing 4-fluoro-1,3-dioxolane-2-one and propylene carbonate at a weight ratio of 1:1 to form a solvent, and dissolving 1 mol/dm$^3$ of lithium hexafluorophosphate as an electrolyte salt in the solvent. Next, as a polymer compound, a copolymer formed by block copolymizing vinylidene fluoride and hexafluoropropylene at a weight ratio of vinylidene fluoride:hexafluoropropylene=93:7 was prepared, and the polymer compound and the formed electrolytic solution were mixed with a mixture solvent to form a precursor solution. After that, the formed precursor solution was applied to the cathode 33 and the anode 34, and the mixture solvent was volatilized to form the gel electrolyte layer 36.

Next, the cathode lead made of aluminum was attached to the cathode 33, and the anode lead 32 made of nickel was attached to the anode 34, and after the cathode 33 and the anode 34 were laminated and spirally wound with the separator 35 made of polyethylene with a thickness of 25 μm in between, they were sealed in the package members 40 made of a laminate film under reduced pressure to form each of the secondary batteries.

As Comparative Example 5-1 relative to Example 5-1 to 5-3, a secondary battery was formed as in the case of Examples 5-0.1 to 5-3, except that the oxide-containing film was not arranged.

The cycle characteristics of the formed secondary batteries of Examples 5-1 to 5-3 and Comparative Example 5-1 were determined as in the case of Examples 1-1 to 1-7. The results are shown in Table 5.

TABLE 5

Battery shape: laminate type
Anode active material: silicon (electron beam evaporation)

| | OXIDE-CONTAINING FILM | MATERIAL | FORMING METHOD | IMMERSING TIME (HOUR) | THICKNESS (nm) | DISCHARGE CAPACITY RETENTION RATIO (%) |
|---|---|---|---|---|---|---|
| EXAMPLE 5-1 | PRESENT | SILICON OXIDE | LIQUID-PHASE | 1 | 20 | 84 |
| EXAMPLE 5-2 | PRESENT | SILICON OXIDE | LIQUID-PHASE | 3 | 40 | 86 |
| EXAMLPE 5-3 | PRESENT | SILICON OXIDE | LIQUID-PHASE | 6 | 50 | 86 |
| COMPARATIVE EXAMPLE 5-1 | ABSENT | — | — | — | — | 72 |

As shown in Table 5, the same results as those in Examples 1-1 to 1-5 were obtained. More specifically, it was found out that even in the case where a gel electrolyte was used, when the oxide-containing film made of silicon oxide was arranged on a region in contact with the electrolyte of the surface of each anode active material particle including at least one of silicon and tin as an element by a liquid-phase method, the cycle characteristics could be improved.

Examples 6-1 to 6-9

Laminate film type secondary batteries shown in FIGS. 3 and 4 were formed.

At first, the cathode 33 was formed. More specifically, lithium carbonate ($Li_2CO_3$) and cobalt carbonate ($CoCO_3$) were mixed at a molar ratio of $Li_2CO_3:CoCO_3=0.5:1$ and the mixture was fired in air at 900° C. for 5 hours to obtain lithium cobalt complex oxide ($LiCoO_2$). Next, after 91 parts by weight of the lithium cobalt complex oxide, 6 parts by weight of graphite as an electrical conductor and 3 parts by weight of polyvinylidene fluoride as a binder were mixed to form a cathode mixture, the cathode mixture was dispersed in N-methyl-2-pyrrolidone as a solvent to form cathode mixture slurry. Next, after the cathode mixture slurry was uniformly applied to both sides of the cathode current collector 33A made of aluminum foil with a thickness of 12 μm, and was dried, the cathode mixture slurry was compression molded by a roller press to form the cathode active material layer 33B. After that, the cathode lead 31 made of aluminum was attached to an end of the cathode current collector 33A.

Next, the anode 34 was formed. More specifically, at first, a plurality of anode active material particles 34C made of silicon were formed on the anode current collector 34A made of copper foil with a thickness of 10 μm by an electron beam evaporation method, and after that, the oxide-containing film 34D was selectively formed on the surfaces of the anode active material particles 34C by a sol-gel method. To perform the sol-gel method, at first, 25 g of tetraethoxysilane was added to a solution formed by mixing 75.2 g of ethanol, 23.5 g of water, 0.3 g of hydrochloric acid, 0.9 g of lithium hexafluorophosphate, and was stirred for 2 hours to form a treatment solution. However, in Example 6-9, lithium hexafluorophosphate was not added in the treatment solution. Next, after the anode current collector 34A on which the anode active material layer 34B was formed was immersed in and taken out of the treatment solution, and a solvent such as ethanol was sufficiently volatilized, the anode current collector 34A was fired for 1 hour at 200° C. Thereby, as shown in FIG. 7, the oxide-containing film 34D made of silicon oxide ($SiO_2$) was formed on a region in contact with the electrolytic solution of the surface of each anode active material particle 34C to obtain the anode active material layer 34B. The thickness of the oxide-containing film 34D fell within a range from 30 nm to 300 nm. Finally, the anode lead 32 made of nickel was attached to an end of the anode current collector 34A.

Next, after a solvent formed by mixing a base including a mixture of ethylene carbonate (EC) and diethyl carbonate (DEC) at a weight ratio of 1:1 and 1 wt % of each of various additives shown in Table 6 (to be mentioned later) relative to the base was prepared, 1 mol/kg of lithium hexafluorophosphate as an electrolyte salt was dissolved in the solvent to form the electrolytic solution. However, in Example 6-1, the additives were not used. In Table 6, VC indicates vinylene carbonate (1,3-dioxol-2-one), VEC indicates vinyl ethylene carbonate (4-vinyl-1,3-dioxolane-2-one), FEC indicates fluoroethylene carbonate (4-fluoro-1,3-dioxolane-2-one), DFEC indicates difluoroethylene carbonate (4,5-difluoro-1,3-dioxolane-2-one), PRS indicates propene sultone, SCAH indicates succinic anhydride, and SBAH indicates sulfobenzoic anhydride. After the electrolytic solution was formed, a copolymer formed by block copolymerizing vinylidene fluoride and hexafluoropropylene at a weight ratio of vinylidene fluoride:hexafluoropropylene=93:7 was prepared as a polymer compound, and the polymer compound and the formed electrolytic solution were mixed with a predetermined mixture solvent to form a precursor solution. After that, the formed precursor solution was applied to the cathode 33 and the anode 34, and the mixture solvent was volatilized to form the gel electrolyte layer 36.

Next, after the cathode 33 and the anode 34 were laminated and spirally wound with the separator 35 made of polyethylene with a thickness of 25 μm in between, they were sealed in the package members 40 made of a laminate film under reduced pressure to form each of the secondary batteries.

Moreover, as Comparative Examples 6-1 and 6-2, secondary batteries were formed as in the case of Examples 6-1 and 6-5, except that the oxide-containing film was not arranged.

The cycle characteristics of the formed secondary batteries of Examples 6-1 to 6-9 and Comparative Examples 6-1 and 6-2 were determined. The cycle characteristics were determined by performing 100 cycles of charge and discharge at 23° C., and then determining the discharge capacity retention ratio (%) in the 100th cycle in the case where the discharge capacity in the second cycle was 100. At that time, after the secondary batteries were charged at a constant current density of 1 $mA/cm^2$ until the battery voltage reached 4.2 V, the secondary batteries were charged at a constant voltage of 4.2 V until the current density reached 0.02 $mA/cm^2$, and the secondary batteries were discharged at a constant current density of 1 $mA/cm^2$ until the battery voltage reached 2.5 V. The results are shown in Table 6.

TABLE 6

Battery shape: laminate type
Anode active material: silicon (electron beam evaporation)
Method of forming oxide-containing film: sol-gel method

| | OXIDE-CONTAINING FILM | MATERIAL | SOLVENT BASE | SOLVENT ADDITIVE | OTHER CONDITION | DISCHARGE CAPACITY RETENTION RATIO (%) |
|---|---|---|---|---|---|---|
| EXAMPLE 6-1 | PRESENT | SILICON OXIDE | EC AND DEC | — | — | 42 |
| EXAMPLE 6-2 | PRESENT | SILICON OXIDE | | VC | — | 53 |
| EXAMPLE 6-3 | PRESENT | SILICON OXIDE | | VEC | — | 51 |
| EXAMPLE 6-4 | PRESENT | SILICON OXIDE | | FEC | — | 51 |
| EXAMPLE 6-5 | PRESENT | SILICON OXIDE | | DFEC | — | 68 |
| EXAMPLE 6-6 | PRESENT | SILICON OXIDE | | PRS | — | 43 |

TABLE 6-continued

Battery shape: laminate type
Anode active material: silicon (electron beam evaporation)
Method of forming oxide-containing film: sol-gel method

| | OXIDE-CONTAINING FILM | MATERIAL | SOLVENT BASE | SOLVENT ADDITIVE | OTHER CONDITION | DISCHARGE CAPACITY RETENTION RATIO (%) |
|---|---|---|---|---|---|---|
| EXAMPLE 6-7 | PRESENT | SILICON OXIDE | | SCAH | — | 44 |
| EXAMPLE 6-8 | PRESENT | SILICON OXIDE | | SBAH | — | 45 |
| EXAMLPE 6-9 | PRESENT | SILICON OXIDE | | — | *1 | 30 |
| COMPARATIVE EXAMPLE 6-1 | ABSENT | — | EC AND DEC | — | — | 23 |
| COMPARATIVE EXAMPLE 6-2 | ABSENT | — | — | DFEC | — | 44 |

*1: $LiPF_6$ was not added in the treatment solution which was used to form the oxide-containing film.

As shown in Table 6, it was found out that even in the case where the oxide-containing film made of silicon oxide was formed on a region in contact with the electrolyte of the surface of each anode active material particle by a sol-gel method, the cycle characteristics could be improved. Moreover, it was confirmed by comparison between Example 6-1 and Example 6-9 that when $LiPF_6$ was added in the treatment solution of the sol-gel method which was used to form the oxide-containing film, the cycle characteristics could be further improved.

Example 7-1

A secondary battery of Example 7-1 was formed as in the case of Example 6-5, except that cobalt was deposited by a electrolytic plating method while supplying air in a plating bath so that gaps between the anode active material particles 34C covered with the oxide-containing film 34D were filled with cobalt. At that time, as a plating solution, a cobalt plating solution of Japan Pure Chemical Co., Ltd was used, and the current density was 2 A/dm² to 5 A/dm², and the plating speed was 10 nm/sec.

Example 7-2

A secondary battery of Example 7-2 was formed as in the case of Example 6-5, except that the oxide-containing film 34D was formed by a liquid-phase deposition method as in the case of Example 1-3.

Example 7-3

A secondary battery of Example 7-3 was formed as in the case of Example 7-1, except that the oxide-containing film 34D was formed by a liquid-phase deposition method as in the case of Example 1-3.

Moreover, as Comparative Example 7-1, a secondary battery was formed as in the case of Examples 7-1 and 7-3, except that the oxide-containing film was not arranged.

The cycle characteristics of the formed secondary batteries of Examples 7-1 to 7-3 and Comparative Example 7-1 were determined as in the case of Examples 6-1 to 6-9. The results are shown in Table 7 together with the results of Example 6-5 and Comparative Example 6-2.

TABLE 7

Battery shape: laminate type
Anode active material: silicon (electron beam evaporation)

| | OXIDE-CONTAINING FILM | MATERIAL | FORMING METHOD | SOLVENT BASE | SOLVENT ADDITIVE | Co PLATING | DISCHARGE CAPACITY RETENTION RATIO (%) |
|---|---|---|---|---|---|---|---|
| EXAMPLE 6-5 | PRESENT | SILICON OXIDE | SOL-GEL | EC AND DEC | DFEC | ABSENT | 68 |
| EXAMPLE 7-1 | PRESENT | SILICON OXIDE | SOL-GEL | | DFEC | PRESENT | 74 |
| EXAMPLE 7-2 | PRESENT | SILICON OXIDE | LIQUID-PHASE DEPOSITION | | DFEC | ABSENT | 69 |
| EXAMLPE 7-3 | PRESENT | SILICON OXIDE | LIQUID-PHASE DEPOSITION | | DFEC | PRESENT | 75 |
| COMPARATIVE EXAMPLE 6-2 | ABSENT | | | EC AND DEC | DFEC | ABSENT | 44 |
| COMPARATIVE EXAMPLE 7-1 | ABSENT | | | — | DFEC | PRESENT | 46 |

As shown in Table 7, it was confirmed by comparison between Examples 6-5 and 7-1 or comparison between Examples 7-2 and 7-3 that when gaps between the adjacent anode active material particles were filled with a metal including a metal element not alloyed with an electrode reactant, the cycle characteristics could be further improved. Moreover, it was confirmed by comparison between Examples 7-1 and 7-3 and Comparative Example 7-1 that when the gaps were filled with the above-described metal while forming the oxide-containing film 34D, the cycle characteristics could be further improved.

Example 8-1

A secondary battery of Example 8-1 was formed as in the case of Example 6-1, except that an electrolytic solution in which 0.9 mol/kg of $LiPF_6$ and 0.1 mol/kg of $LiBF_4$ were dissolved as electrolyte salts was used.

Example 8-2

A secondary battery of Example 8-2 was formed as in the case of Example 6-1, except that an electrolytic solution in which 0.9 mol/kg of $LiPF_6$ and 0.1 mol/kg of the compound represented by Chemical Formula 8(6) were dissolved as electrolyte salts was used.

Example 8-3

A secondary battery of Example 8-3 was formed as in the case of Example 6-1, except that an electrolytic solution in which 0.9 mol/kg of $LiPF_6$ and 0.1 mol/kg of the compound represented by Chemical Formula 9(2) were dissolved as electrolyte salts was used.

Example 8-4

A secondary battery of Example 8-4 was formed as in the case of Example 6-1, except that an electrolytic solution in which 0.9 mol/kg of $LiPF_6$ and 0.1 mol/kg of the compound represented by Chemical Formula 13(2) were dissolved as electrolyte salts was used.

Example 8-5

A secondary battery of Example 8-5 was formed as in the case of Example 6-1, except that an electrolytic solution in which 0.9 mol/kg of $LiPF_6$, 0.05 mol/kg of the compound represented by Chemical Formula 8(6) and 0.05 mol/kg of the compound represented by Chemical Formula 13(2) were dissolved as, electrolyte salts was used.

Moreover, as Comparative Example 8-1, a secondary battery was formed as in the case of Example 8-2, except that the oxide-containing film was not arranged.

The cycle characteristics of the formed secondary batteries of Examples 8-1 to 8-5 and Comparative Example 8-1 were determined as in the case of Examples 6-1 to 6-9. The results are shown in Table 8 together with the results of Example 6-1 and Comparative Example 6-1.

TABLE 8

Battery shape: laminate type
Anode active material: silicon (electron beam evaporation)
Oxide-containing film: silicon oxide (sol-gel method)

| | OXIDE-CONTAINING FILM | ELECTROLYTE SALT | | | DISCHARGE CAPACITY RETENTION RATIO (%) |
|---|---|---|---|---|---|
| EXAMPLE 6-1 | PRESENT | | $LiPF_6$ 1.0 mol/kg | | 42 |
| EXAMPLE 8-1 | PRESENT | $LiPF_6$ 0.9 mol/kg | $LiBF_4$ 0.1 mol/kg | | 43 |
| EXAMPLE 8-2 | PRESENT | | CHEMICAL FORMULA 8(6) 0.1 mol/kg | | 46 |
| EXAMPLE 8-3 | PRESENT | | CHEMICAL FORMULA 9(2) 0.1 mol/kg | | 48 |
| EXAMPLE 8-4 | PRESENT | | CHEMICAL FORMULA 13(2) 0.1 mol/kg | | 43 |
| EXAMPLE 8-5 | PRESENT | $LiPF_6$ 0.8 mol/kg | CHEMICAL FORMULA 8(6) 0.05 mol/kg | CHEMICAL FORMULA 13(2) 0.05 mol/kg | 48 |
| COMPARATIVE EXAMPLE 6-1 | ABSENT | | $LiPF_6$ 1.0 mol/kg | | 23 |
| COMPARATIVE EXAMPLE 8-1 | ABSENT | $LiPF_6$ 0.9 mol/kg | CHEMICAL FORMULA 8(6) 0.1 mol/kg | | 32 |

As shown in Table 8, it was found out by comparison between Example 6-1 and Examples 8-1 to 8-5 that when LiBF$_4$, the compound represented by Chemical Formula 8(6), the compound represented by Chemical Formula 9(2), the compound represented by Chemical Formula 13(2) or the like was included as the electrolyte salt in addition to LiPF$_6$, higher cycle characteristics could be obtained. Moreover, it was confirmed by comparison between Example 8-1 and Comparative Example 8-1 that even in the case where another electrolyte salt was added to LiPF$_6$, an effect of improving the cycle characteristics by arranging the oxide-containing film could be obtained.

Examples 9-1 to 9-7

Coin type secondary batteries shown in FIG. 6 were formed. The secondary batteries had a configuration in which the cathode 51 and the anode 52 were laminated with the separator 53 impregnated with the electrolytic solution in between, and they were sandwiched between the package can 54 and the package cup 55, and the package can 54 and the package cup 55 were caulked by the gasket 56.

At first, after the anode active material layer 52B was formed on the anode current collector 52A made of copper foil with a thickness of 10 μm by evaporating silicon by an electron beam evaporation method, the anode current collector 52A on which the anode active material layer 52B was formed was stamped into a pellet with a diameter of 16 mm.

Next, in Examples 9-1 to 9-5, the anode current collector 52A on which the anode active material layer 52B was formed was immersed in a solution formed by dissolving boric acid as an anion trapping agent in hexafluorosilicic acid as a fluoride complex, thereby a coating film including silicon oxide (SiO$_2$) and a fluoride of silicon was deposited on the surface of the anode active material made of silicon. At that time, the concentrations of hexafluorosilicic acid and boric acid were 2 mol/dm$^3$ and 0.028 mol/dm$^3$, respectively. Moreover, the immersing time was 1 hour in Example 9-1, 2 hours in Example 9-2, 3 hours in Example 9-3, 6 hours in Example 9-4, and 21 hours in Example 9-5. After that, the anode current collector 52A was cleaned with water, and dried under reduced pressure to form the anode 52.

Moreover, in Example 9-6, the anode current collector 52A on which the anode active material layer 52B was formed was immersed in a solution formed by dissolving aluminum chloride as an anion trapping agent in hexafluorostannic acid as fluoride complex, thereby a coating film including tin oxide and a fluoride of tin was deposited on the surface of the anode active material made of silicon. At that time, the concentrations of hexafluorostannic acid and aluminum chloride were 0.17 mol/dm$^3$ and 0.07 mol/dm$^3$, respectively, and the immersing time was 3 hours. After that, the anode current collector 52A was cleaned with water, and dried under reduced pressure to form the anode 52.

Further, in Example 9-7, the anode current collector 52A on which the anode active material layer 52B was formed was immersed in a solution formed by dissolving aluminum chloride as an anion trapping agent in hexafluorogermanic acid as a fluoride complex, thereby a coating film including germanium oxide and a fluoride of germanium was deposited on the surface of the anode active material made of silicon. At that time, the concentrations of hexafluorogermanic acid and aluminum chloride were 0.17 mol/dm$^3$ and 0.05 mol/dm$^3$, respectively, and the immersing time was 3 hours. After that, the anode current collector 52A was cleaned with water, and dried under reduced pressure to form the anode 52.

The ratio of elements in the coating film was determined by XPS through the use of the formed anode 52. The results are shown in Table 9.

TABLE 9

Battery shape: coin type
Anode active material: silicon (electron beam evaporation)

| | IMMERSING TIME | XPS (at %) | | | | | | | | DISCHARGE CAPACITY RETENTION RATIO (%) |
|---|---|---|---|---|---|---|---|---|---|---|
| | | Si | O | F | Sn | GE | F/Si | F/Sn | F/Ge | |
| EXAMPLE 9-1 | 1 HOUR | 28.8 | 60.1 | 3.5 | — | — | 0.12 | — | — | 85 |
| EXAMPLE 9-2 | 2 HOURS | 29.0 | 61.8 | 3.6 | — | — | 0.12 | — | — | 92 |
| EXAMPLE 9-3 | 3 HOURS | 29.4 | 63.0 | 3.7 | — | — | 0.13 | — | — | 92 |
| EXAMPLE 9-4 | 6 HOURS | 28.5 | 60.0 | 4.0 | — | — | 0.14 | — | — | 93 |
| EXAMPLE 9-5 | 21 HOURS | 28.0 | 58.3 | 6.0 | — | — | 0.21 | — | — | 92 |
| EXAMPLE 9-6 | 3 HOURS | 23.0 | 56.0 | 2.0 | 15.3 | — | — | 0.13 | — | 91 |
| EXAMPLE 9-7 | 3 HOURS | 30.0 | 55.5 | 1.5 | — | 10.3 | — | — | 0.14 | 91 |
| COMPARATIVE EXAMPLE 9-1 | — | 44.4 | 49.0 | 0 | — | — | — | — | — | 76 |
| COMPARATIVE EXAMPLE 9-2 | — | 30.5 | 57.5 | 0 | — | — | — | — | — | 76 |

Moreover, lithium carbonate (Li$_2$CO$_3$) and cobalt carbonate (CoCO$_3$) were mixed at a molar ratio of Li$_2$CO$_3$:CoCO$_3$=0.5:1, and the mixture was fired in air for 5 hours at 900° C. to obtain lithium cobalt complex oxide (LiCoO$_2$) as the cathode active material. Next, after 91 parts by weight of the lithium cobalt complex oxide, 6 parts by weight of graphite as an electrical conductor and 3 parts by weight of polyvinylidene fluoride as a binder were mixed to form a cathode mixture, the cathode mixture was dispersed in N-methyl-2-pyrrolidone as a solvent to form cathode mixture slurry. Next, after the cathode mixture slurry was uniformly applied to the cathode current collector 51A made of aluminum foil with a thickness of 20 μm, and was dried, the cathode mixture slurry was compression molded to form the cathode active material layer 51B. After that, the cathode current collector 51A on which the cathode active material layer 51B was formed was stamped into a pellet with a diameter of 15.5 nm to form the cathode 51.

Next, after the cathode 51 and the anode 52 were positioned in the package can 54 with the separator 53 made of a microporous polypropylene film in between, and the electrolytic solution was injected onto the cathode 51 and the anode 52, and the package cup 55 was put onto the package can 54, and they were sealed by caulking. As the electrolytic solution, an electrolytic solution formed by dissolving 1 mol/dm$^3$ of lithium hexafluorophosphate as an electrolyte salt in a solvent formed by mixing 4-fluoro-1,3-dioxolane-2-one and diethyl carbonate at a weight ratio of 1:1 was used.

As Comparative Example 9-1 relative to Examples 9-1 to 9-7, a secondary battery was formed as in the case of Examples 9-1 to 9-7, except that a coating film including an oxide of silicon, germanium or tin and a fluoride of silicon, germanium or tin was not formed. Moreover, as Comparative Example 9-2, a secondary battery was formed as in the case of Examples 9-1 to 9-7, except that an anode formed by forming the anode active material layer by evaporating silicon on the anode current collector by a electron beam evaporation method, and then forming a coating film made of silicon oxide on the surface of the anode active material layer by a vapor-phase method was used.

The cycle characteristics of the formed secondary batteries of Examples 9-1 to 9-7 and Comparative Examples 9-1 and 9-2 were determined. The cycle characteristics were determined by performing 100 cycles of charge and discharge at 23° C., and then determining the capacity retention ratio (%) in the 100th cycle in the case where the discharge capacity in the second cycle was 100. At that time, after the secondary batteries were charged at a constant current density of 1 mA/cm$^2$ until the battery voltage reached 4.2 V, the secondary batteries were charged at a constant voltage of 4.2 V until the current density reached 0.02 mA/cm$^2$, and the secondary batteries were discharged at a constant current density of 1 mA/cm$^2$ until the battery voltage reached 2.5 V. The results are shown in Table 9.

As shown in Table 9, it was confirmed by the results obtained by XPS that in Examples 9-1 to 9-5, silicon, oxygen and fluorine were observed, and silicon oxide and a fluoride of silicon were present. Moreover, in Example 9-6, it was confirmed that oxygen, fluorine and tin were observed, and tin oxide and a fluoride of tin were present. Further in Example 9-7, it was confirmed that oxygen, fluorine and germanium were observed, and germanium oxide and a fluoride of germanium were present.

Moreover, in Examples 9-1 to 9-7 in which a coating film including an oxide of silicon and a fluoride of silicon, a coating film including an oxide of tin and a fluoride of tin, or a coating film including an oxide of germanium and a fluoride of germanium was formed on the surface of anode active material made of silicon, compared to Comparative Examples 9-1 and 9-2, the discharge capacity retention ratio was improved.

In other words, it was found out that when a coating film including an oxide of at least one kind selected from the group consisting of silicon, germanium and tin and a halide of at least one kind selected from the group consisting of silicon, germanium and tin was arranged on at least a part of the surface of the anode active material including silicon as an element, the cycle characteristics could be improved.

Examples 10-1 to 10-5

At first, 90 wt % of silicon powder with an average particle diameter of 1 μm as an anode active material and 10 wt % of polyvinylidene fluoride as a binder were mixed to form a mixture, and the mixture was dispersed in N-methyl-2-pyrrolidone as a solvent to form anode mixture slurry. Next, after the anode mixture slurry was uniformly applied to the anode current collector 52A made of copper foil with a thickness of 18 μm, and the anode mixture slurry was dried and compressed, the anode mixture slurry was heated for 12 hours at 400° C. in a vacuum atmosphere to form the anode active material layer 52B, and the anode current collector 52A on which the anode active material layer 52B was formed was stamped into a pellet with a diameter of 16 mm. Next, the anode current collector 52A on which the anode active material layer 52B was formed was immersed in a solution formed by dissolving boric acid in hexafluorosilicic acid as in the case of Examples 9-1 to 9-5, thereby a coating film including silicon oxide ($SiO_2$) and a fluoride of silicon was deposited on the surface of the anode active material made of silicon. At that time, the immersing time was 1 hour in Example 10-1, 2 hours in Example 10-2, 3 hours in Example 10-3, 6 hours in Example 10-4 and 21 hours in Example 10-5. After that, the anode current collector 52A was cleaned with water, and dried under reduced pressure to form the anode 52.

After the anode 52 was formed, secondary batteries were formed through the use of the anode 52 as in the case of Examples 9-1 to 9-5.

As Comparative Example 10-1 relative to Examples 10-1 to 10-5, a secondary battery was formed as in the case of Examples 10-1 to 10-5, except that a coating film including an oxide of silicon and a fluoride of silicon was not formed. Moreover, as Comparative Example 10-2, a secondary battery was formed as in the case of Examples 10-1 to 10-5, except that an anode in which a coating film made of silicon oxide was formed by heating the surface of silicon powder with an average particle diameter of 1 μm in air at 1000° C. to oxidize the silicon powder was used.

The cycle characteristics of the secondary batteries of Examples 10-1 to 10-5 and Comparative Examples 10-1 and 10-2 were determined as in the case of Examples 9-1 to 9-7. The results are shown in Table 10.

TABLE 10

Battery shape: coin type
Anode active material: silicon (coating)

| | IMMERSING TIME | DISCHARGE CAPACITY RETENTION RATIO (%) |
|---|---|---|
| EXAMPLE 10-1 | 1 HOUR | 70 |
| EXAMPLE 10-2 | 2 HOURS | 71 |
| EXAMPLE 10-3 | 3 HOURS | 71 |
| EXAMPLE 10-4 | 6 HOURS | 70 |
| EXAMPLE 10-5 | 21 HOURS | 71 |
| COMPARATIVE EXAMPLE 10-1 | — | 69 |
| COMPARATIVE EXAMPLE 10-2 | — | 65 |

As shown in Table 10, the same results as those in Examples 9-1 to 9-5 were obtained. More specifically, it was found out that in the case where a coating film including an oxide of at least one kind selected from the group consisting of silicon, germanium and tin and a halide of at least one kind selected from the group consisting of silicon, germanium and tin was arranged on at least a part of the surface of the anode active material including silicon as an element, even if the method of forming the anode active material layer 52B was changed, the cycle characteristics could be improved.

Examples 11-1 to 11-3

At first, 80 parts by weight of the SnCoC-containing material as the anode active material, 11 parts by weight of graphite and 1 part by weight of acetylene black as electrical conductors and 8 parts by weight of polyvinylidene fluoride as a binder were mixed to form a mixture, and the mixture was dispersed in N-methyl-2-pyrrolidone as a solvent to form anode mixture slurry. Next, after the anode mixture slurry was uniformly applied to the anode current collector 52A made of copper foil with a thickness of 10 µm, and dried, the anode mixture slurry was compression molded to form the anode active material layer 52B, and the anode current collector 52A on which the anode active material layer 52B was formed was stamped into a pellet with a diameter of 16 mm. Next, the anode current collector 52A on which the anode active material layer 52B was formed was immersed in a solution formed by dissolving boric acid in hexafluorosilicic acid as in the case of Examples 9-1 to 9-5 to deposit a coating film including silicon oxide ($SiO_2$) and a fluoride of silicon on the surface of the anode active material made of the SnCoC-containing material. At that time, the concentrations of hexafluorosilicic acid and boric acid were 0.1 mol/l and 0.028 mol/l, respectively. The immersing time was 1 hour in Example 11-1, 3 hours in Example 11-2 and 6 hours in Example 11-3. After that, the anode current collector 52A on which the anode active material layer 52B was formed was cleaned with water, and dried under reduced pressure to form the anode 52.

The SnCoC-containing material was synthesized by mixing tin-cobalt-indium alloy powder and carbon powder, and inducing a mechanochemical reaction between them. When the composition of the obtained SnCoC-containing material was analyzed, the tin content was 48 wt %, the cobalt content was 23 wt %, and the carbon content was 20 wt %, and the ratio of cobalt to the total of tin and cobalt Co/(Sn+Co) was 32.4 wt %. The carbon content was measured by a carbon/sulfur analyzer, and the contents of tin and cobalt were measured by ICP (Inductively Coupled Plasma) emission spectrometry. Moreover, when X-ray diffraction was performed on the obtained SnCoC-containing material, a diffraction peak having a broad half-width in which the diffraction angle 2θ was 1.0° or more was observed within a range of the diffraction angle 2θ=20° to 50°. Further, when the XPS measurement was performed on the obtained SnCoC-containing material, the peak P1 shown in FIG. 9 was obtained. When the peak P1 was analyzed, a peak P2 of surface contamination carbon and a peak P3 of C1s in the SnCoC-containing material on a lower energy side than the peak P2 were obtained. The peak P3 was obtained in a region lower than 284.5 eV. In other words, it was confirmed that carbon included in the SnCoC-containing material was bonded to another element.

After the anode 52 was formed, secondary batteries were formed through the use of the anode 52 as in the case of Examples 9-1 to 9-5.

As Comparative Example 11-1 relative to Example 11-1 to 11-3, a secondary battery was formed as in the case of Example 11-1 to 11-3, except that a coating film including an oxide of silicon and a fluoride of silicon was not formed.

The cycle characteristics of the secondary batteries of Examples 11-1 to 11-3 and Comparative Example 11-1 were determined as in the case of Examples 9-1 to 9-7. The results are shown in Table 11.

TABLE 11

Battery shape: coin type
Anode active material: SnCoC-containing material

| | IMMERSING TIME | DISCHARGE CAPACITY RETENTION RATIO (%) |
|---|---|---|
| EXAMPLE 11-1 | 1 HOUR | 91 |
| EXAMPLE 11-2 | 2 HOURS | 92 |
| EXAMPLE 11-3 | 6 HOURS | 91 |
| COMPARATIVE EXAMPLE 11-1 | — | 90 |

As shown in Table 11, the same results as those in Examples 9-1 to 9-5 were obtained. More specifically, it was found out that when a coating film including an oxide of at least one kind selected from the group consisting of silicon, germanium and tin and a halide of at least one kind selected from the group consisting of silicon, germanium and tin was arranged on at least a part of the surface of the anode active material including tin as an element, the cycle characteristics could be improved.

Examples 12-1 to 12-3

Cylindrical type secondary batteries shown in FIGS. 1 and 2 were formed. At that time, the cathode 21 and the anode 22 were formed as in the case of Examples 9-1, 9-3 and 9-4. The anode 22 was formed by forming the anode active material layer 22B made of silicon by an electron beam evaporation method, and then forming a coating film including silicon oxide and a fluoride of silicon. As the separator 23, a microporous polypropylene film with a thickness of 25 µm was used, and the electrolytic solution was the same as that in Examples 9-1 to 9-7.

The ratio of elements in the coating film was determined by XPS through the use of the formed anode 22. The results are shown in Table 12.

TABLE 12

Battery shape: cylindrical type
Anode active material: silicon (electron beam evaporation)

| | IMMERSING TIME | XPS (at %) | | | | DISCHARGE CAPACITY RETENTION RATIO (%) |
|---|---|---|---|---|---|---|
| | | Si | O | F | F/Si | |
| EXAMPLE 12-1 | 1 HOUR | 28.0 | 60.3 | 3.5 | 0.13 | 83 |
| EXAMPLE 12-2 | 3 HOURS | 29.6 | 60.8 | 3.8 | 0.13 | 85 |
| EXAMPLE 12-3 | 6 HOURS | 28.8 | 65.2 | 3.6 | 0.13 | 88 |
| COMPARATIVE EXAMPLE 12-1 | — | 44.4 | 49.0 | 0 | — | 74 |

As Comparative Example 12-1 relative to Examples 12-1 to 12-3, a secondary battery was formed as in the case of Examples 12-1 to 12-3, except that a coating film including an oxide of silicon and a fluoride of silicon was not formed.

The cycle characteristics of the secondary batteries of Examples 12-1 to 12-3 and Comparative Example 12-1 were determined as in the case of Examples 9-1 to 9-7. The results are shown in Table 12.

As shown in Table 12, the same results as those in Examples 9-1 to 9-5 were obtained. More specifically, it was found out that even in the case of a secondary battery with another shape, when a coating film including an oxide of at least one kind selected from silicon, germanium and tin and a halide of at least one kind selected from silicon, germanium and tin was formed on at least a part of the surface of the anode active material including at least one of silicon and tin as an element, the cycle characteristics could be improved.

Examples 13-1 to 13-3

Laminate film type secondary batteries shown in FIGS. 3 and 4 were formed. At first, the cathode 33 and the anode 34 were formed as in the case of Examples 9-1, 9-3 and 9-4. The anode 34 was formed by forming the anode active material layer 34B made of silicon by an electron beam evaporation method, and then forming a coating film including silicon oxide and a fluoride of silicon. Moreover, the ratio of elements in the coating film was determined by XPS through the use of the formed anode 34. The results are shown in Table 13.

TABLE 13

Battery shape: laminate type
Anode active material: silicon (electron beam evaporation)

| | IM-MERSING TIME | XPS (at %) | | | | DISCHARGE CAPACITY RETENTION RATIO (%) |
|---|---|---|---|---|---|---|
| | | Si | O | F | F/Si | |
| EXAMPLE 13-1 | 1 HOUR | 28.8 | 60.2 | 3.6 | 0.13 | 84 |
| EXAMPLE 13-2 | 3 HOURS | 29.0 | 60.5 | 3.3 | 0.11 | 86 |
| EXAMPLE 13-3 | 6 HOURS | 29.1 | 66.9 | 3.7 | 0.13 | 86 |
| COMPARATIVE EXAMPLE 13-1 | — | 44.4 | 49.0 | 0 | — | 72 |

Next, an electrolytic solution was formed by mixing 4-fluoro-1,3-dioxolane-2-one and propylene carbonate at a weight ratio of 1:1 to form a solvent, and dissolving 1 mol/l of lithium hexafluorophosphate as an electrolyte salt in the solvent. Next, as a polymer compound, a copolymer formed by block copolymerizing vinylidene fluoride and hexafluoropropylene at a weight ratio of vinylidene fluoride:hexafluoropropylene=93:7 was prepared, and the polymer compound and the formed electrolytic solution were mixed with a mixture solvent to form a precursor solution. After that, the formed precursor solution was applied to the cathode 33 and the anode 34, and the mixture solvent was volatilized to form the gel electrolyte layer 36.

Next, the cathode lead 31 made of aluminum was attached to the cathode 33, and the anode lead 32 made of nickel was attached to the anode 34, and after the cathode 33 and the anode 34 were laminated and spirally wound with the separator 35 made of polyethylene with a thickness of 25 μm, they were sealed in the package members 40 made of a laminate film under reduced pressure to form each of the secondary batteries.

As Comparative Example 13-1 relative to Examples 13-1 to 13-3, a secondary battery was formed as in the case of Example 13-1 to 13-3, except that a coating film including an oxide of silicon and a fluoride of silicon was not formed.

The cycle characteristics of the secondary batteries of Examples 13-1 to 13-3 and Comparative Example 13-1 were determined as in the case of Examples 9-1 to 9-7. The results are shown in Table 13.

As shown in Table 13, the same results as those in Examples 9-1 to 9-5 were obtained. More specifically, it was found out that even in the case where a gel electrolyte was used, when a coating film including an oxide of at least one kind selected from the group consisting of silicon, germanium and tin and a halide of at least one kind selected from silicon, germanium and tin was formed on at least a part of the surface of the anode active material including at least one of silicon and tin as an element, the cycle characteristics could be improved.

Examples 14-1 to 14-11

At first, the cathode 33 was formed. More specifically, lithium carbonate ($Li_2CO_3$) and cobalt carbonate ($CoCO_3$) were mixed at a molar ratio of $Li_2CO_3:CoCO_3=0.5:1$, and the mixture was fired in air at 900° C. for 5 hours to obtain lithium cobalt complex oxide ($LiCoO_2$). Next, after 91 parts by weight of the lithium cobalt complex oxide, 6 parts by weight of graphite as an electrical conductor and 3 parts by weight of polyvinylidene fluoride as a binder were mixed to form a cathode mixture, the cathode mixture was dispersed in N-methyl-2-pyrrolidone as a solvent to form cathode mixture slurry. Next, after the cathode mixture slurry was uniformly applied to both sides of the cathode current collector 33A made of aluminum foil with a thickness of 12 μm, and was dried, the cathode mixture slurry was compression molded by a roller press to form the cathode active material layer 33B. After that, the cathode lead 31 made of aluminum was attached to an end of the cathode current collector 33A by welding.

Next, the anode 34 was formed. More specifically, at first, a plurality of anode active material particles made of silicon were formed on the anode current collector 34A made of copper foil with a thickness of 10 μm by an electron beam evaporation method, and a coating film including silicon oxide and a fluoride of silicon was selectively formed on the surfaces of the anode active material particles to obtain the anode active material layer 34B. The coating film was formed by a sol-gel method in Examples 14-1 to 14-9. To perform the sol-gel method, at first, 25 g of tetraethoxysilane was added to a solution formed by mixing 75.2 g of ethanol, 23.5 g of water, 0.3 g of hydrochloric acid, 0.9 g of lithium hexafluorophosphate, and was stirred for 2 hours to form a treatment solution. Next, after the anode current collector 34A on which the anode active material layer 34B was formed was immersed in and taken out of the treatment solution, and a solvent such as ethanol was sufficiently volatilized, the anode current collector 34A was fired for 1 hour at 200° C. On the other hand, in Examples 14-10 and 14-11, the coating film was formed by a liquid-phase deposition method as in the case of Example 9-3. The thickness of the coating film fell within a range from 30 nm to 300 nm. Moreover, in Examples 14-9 and 14-11, cobalt was deposited by an electrolytic plating method while supplying air to a plating bath so that gaps between the anode active material particles covered with the coating film were filled with cobalt. At that time, as a plating solution, a cobalt plating solution of Japan Pure Chemical Co., Ltd was used, and the current density was 2 $A/dm^2$ to 5 $A/dm^2$, and the plating speed was 10 nm/sec. Finally, the anode lead 32 made of nickel was attached to an end of the anode current collector 34A.

Next, after a solvent formed by mixing a base including ethylene carbonate (EC) and diethyl carbonate (DEC) at a weight ratio of 1:1 and 1 wt % of each of various additives shown in Table 14 (to be mentioned later) relative to the base was prepared, 1 mol/kg of lithium hexafluorophosphate as an electrolyte salt was dissolved in the solvent to form the electrolytic solution. However, in Example 14-1, the additives were not used. In Table 14, VC indicates vinylene carbonate (1,3-dioxol-2-one), VEC indicates vinyl ethylene carbonate (4-vinyl-1,3-dioxolane-2-one), FEC indicates fluoroethylene carbonate (4-fluoro-1,3-dioxolane-2-one), DFEC indicates difluoroethylene carbonate (4,5-difluoro-1,3-dioxolane-2-one), PRS indicates propene sultone, SCAH indicates succinic anhydride, and SBAH indicates sulfobenzoic anhydride. After the electrolytic solution was formed, as a polymer compound, a copolymer formed by block copolymerizing vinylidene fluoride and hexafluoropropylene at a weight ratio of vinylidene fluoride:hexafluoropropylene=93:7 was prepared, and the polymer compound and the electrolytic solution formed in advance were mixed with a predetermined mixture solvent to form a precursor solution. After that, the formed precursor solution was applied to the cathode 33 and the anode 34, and the mixture solvent was volatilized to form the gel electrolyte layer 36.

Next, after the cathode 33 and the anode 34 were laminated and spirally wound with the separator 35 made of polyethylene with a thickness of 25 μm in between, they were sealed in the package members 40 made of a laminate film under reduced pressure to form each secondary battery.

Comparative Examples 14-1 to 14-3

Moreover, as Comparative Example 14-1, a secondary battery was formed as in the case of Example 14-1, except that the coating film was not arranged, and as Comparative Example 14-2, a secondary battery was formed as in the case of Examples 14-5 and 14-10, except that the coating film was not arranged, and as Comparative Example 14-3, a secondary battery was formed as in the case of Examples 14-9 and 14-11, except that the coating film was arranged.

The cycle characteristics of the secondary batteries of Examples 14-1 to 14-11 and Comparative Examples 14-1 to 14-3 were determined. The cycle characteristics were determined by performing 100 cycles of charge and discharge at 23° C., and then determining the capacity retention ratio (%) in the 100th cycle in the case where the discharge capacity in the second cycle was 100. At that time, after the secondary batteries were charged at a constant current density of 1 mA/cm$^2$ until the battery voltage reached 4.2 V, the secondary batteries were charged at a constant voltage of 4.2 V until the current density reached 0.02 mA/cm$^2$, and the secondary batteries were discharged at a constant current density of 1 mA/cm$^2$ until the battery voltage reached 2.5 V. Moreover, the ratio of elements in the coating film was determined by XPS through the use of formed anode 34. The results are shown in Table 6.

As shown in Table 14, it was confirmed from the results obtained by XPS that in Examples 14-1 to 14-11, silicon, oxygen and fluorine were observed, and silicon oxide and a fluoride of silicon were present. Moreover, it was found out that when the coating film including silicon oxide and a fluoride of silicon was formed on the surfaces of the anode active material particles by a sol-gel method or a liquid-phase deposition method, the cycle characteristics were improved. Further, it was confirmed by comparison between Example 14-5 and Example 14-9 or comparison between Example 14-10 and Example 14-11, when gaps between adjacent anode active material particles were filled with a metal including a metal element not alloyed with an electrode reactant, the cycle characteristics were further improved. Moreover, it was confirmed by comparison between Examples 14-9 and 14-11 and Comparative Example 14-3 that when the gaps were filled with above-described metal while forming the coating film, the cycle characteristics were further improved.

Example 15-1

A secondary battery of Example 15-1 was formed as in the case of Example 14-1, except that an electrolytic solution in which 0.9 mol/kg of $LiPF_6$ and 0.1 mol/kg of $LiBF_4$ as electrolyte salts were dissolved was used.

Example 15-2

A secondary battery of Example 15-2 was formed as in the case of Example 14-1, except that an electrolytic solution in which 0.9 mol/kg of $LiPF_6$ and 0.1 mol/kg of the compound represented by Chemical Formula 8(6) as electrolyte salts were dissolved was used.

Example 15-3

A secondary battery of Example 15-3 was formed as in the case of Example 14-1, except that an electrolytic solution in

TABLE 14

Battery shape: laminate type
Anode active material: silicon (electron beam evaporation)

|  | FORMING METHOD | XPS (at %) | | | | SOLVENT | | Co PLATING | DISCHARGE CAPACITY RETENTION RATIO (%) |
| --- | --- | --- | --- | --- | --- | --- | --- | --- | --- |
|  |  | Si | O | F | F/Si | BASE | ADDITIVE |  |  |
| EXMAPLE 14-1 | SOL-GEL | 32.7 | 51.3 | 2.7 | 0.08 | EC AND DEC | — | ABSENT | 42 |
| EXMAPLE 14-2 |  |  |  |  |  |  | VC |  | 53 |
| EXMAPLE 14-3 |  |  |  |  |  |  | VEC |  | 51 |
| EXMAPLE 14-4 |  |  |  |  |  |  | FEC |  | 51 |
| EXMAPLE 14-5 |  |  |  |  |  |  | DFEC |  | 68 |
| EXMAPLE 14-6 |  |  |  |  |  |  | PRS |  | 43 |
| EXMAPLE 14-7 |  |  |  |  |  |  | SCAH |  | 44 |
| EXMAPLE 14-8 |  |  |  |  |  |  | SBAH |  | 45 |
| EXMAPLE 14-9 |  |  |  |  |  |  | DFEC | PRESENT | 74 |
| EXMAPLE 14-10 | LIQUID-PHASE DEPOSITION | 29.0 | 60.5 | 3.3 | 0.11 | EC AND DEC | DFEC | ABSENT | 69 |
| EXMAPLE 14-11 |  |  |  |  |  |  |  | PRESENT | 75 |
| COMPARATIVE EXMAPLE 14-1 | — |  | 44.4 | 49.0 | 0 | — | EC AND DEC | — | ABSENT | 23 |
| COMPARATIVE EXMAPLE 14-2 |  |  |  |  |  | DEC | DFEC | ABSENT | 44 |
| COMPARATIVE EXMAPLE 14-3 |  |  |  |  |  |  | DFEC | PRESENT | 46 | which 0.9 mol/kg of LIPF$_6$ and 0.1 mol/kg of the compound represented by Chemical Formula 9(2) as electrolyte salts were dissolved was used.

Example 15-4

A secondary battery of Example 15-4 was formed as in the case of Example 14-1, except that an electrolytic solution in which 0.9 mol/kg of LIPF$_6$ and 0.1 mol/kg of the compound represented by Chemical Formula 13(2) as electrolyte salts were dissolved was used.

Example 15-5

A secondary battery of Example 15-5 was formed as in the case of Example 14-1, except that an electrolytic solution in which 0.9 mol/kg of LIPF$_6$, 0.05 mol/kg of the compound represented by Chemical Formula 8(6) and 0.05 mol/kg of the compound represented by Chemical Formula 13(2) as electrolyte salts were dissolved was used.

Moreover, as Comparative Example 15-1, a secondary battery was formed as in the case of Example 15-2, except that the oxide-containing film was not arranged.

The cycle characteristics of the secondary batteries of Examples 15-1 to 15-5 and Comparative Example 15-1 were determined as in the case of Examples 14-1 to 14-11. The results are shown in Table 15 together with the results of Example 14-1 and Comparative Example 14-1.

TABLE 15

Battery shape: laminate type
Anode active material: silicon (electron beam evaporation)
Method of forming coating film: sol-gel method

| | COATING FILM | ELECTROLYTE SALT | | DISCHARGE CAPACITY RETENTION RATIO (%) |
|---|---|---|---|---|
| EXAMPLE 14-1 | PRESENT | | LiPF$_6$ 1.0 mol/kg | 42 |
| EXAMPLE 15-1 | PRESENT | LiPF$_6$ 0.9 mol/kg | LiBF$_4$ 0.1 mol/kg | 43 |
| EXAMPLE 15-2 | PRESENT | | CHEMICAL FORMULA 8(6) 0.1 mol/kg | 46 |
| EXAMPLE 15-3 | PRESENT | | CHEMICAL FORMULA 9(2) 0.1 mol/kg | 48 |
| EXAMPLE 15-4 | PRESENT | | CHEMICAL FORMULA 13(2) 0.1 mol/kg | 43 |
| EXAMPLE 15-5 | PRESENT | LiPF$_6$ 0.8 mol/kg | CHEMICAL FORMULA 8(6) 0.05 mol/kg    CHEMICAL FORMULA 13(2) 0.05 mol/kg | 48 |
| COMPARATIVE EXAMPLE 14-1 | ABSENT | | LiPF$_6$ 1.0 mol/kg | 23 |
| COMPARATIVE EXAMPLE 15-1 | ABSENT | LiPF$_6$ 0.9 mol/kg | CHEMICAL FORMULA 8(6) 0.1 mol/kg | 32 |

As shown in Table 15, it was found out by comparison between Example 14-1 and Examples 15-1 to 15-5 that when LiBF$_4$, the compound represented by Chemical Formula 8(6), the compound represented by Chemical Formula 9(2), the compound represented by Chemical Formula 13(2) or the like was included as the electrolyte salt in addition to LiPF$_6$, higher cycle characteristics could be obtained. Moreover, it was confirmed by comparison between Example 15-2 and Comparative Example 15-1 that even in the case where another electrolyte salt was added to LiPF$_6$, an effect of improving the cycle characteristics by arranging the coating film could be obtained.

Although the present invention is described referring to the embodiments and the examples, the invention is not limited to them, and can be variously modified. For example, in the above-described embodiments and the above-described examples, the case where the electrolytic solution or the gel electrolyte in which a polymer compound holds the electrolytic solution is used as an electrolyte is described; however, any other electrolyte may be used. Examples of the electrolyte include an ionic conducting inorganic compound such as ionic conducting ceramic, ionic conducting glass or ionic crystal, any other inorganic compound, and a mixture of the inorganic compounds and the electrolytic solution or the gel electrolyte.

Moreover, in the above-described embodiment and the above-described examples, the battery using lithium as an electrode reactant is described; however, the invention is applicable to batteries using any other alkali metal such as sodium (Na) or potassium (K), an alkali earth metal such as magnesium (Mg) or calcium (Ca) or any other light metal such as aluminum.

Further, in the above-described embodiment and the above-described examples, the cylindrical type secondary battery, the laminate film type secondary battery and the coin type secondary battery are described in detail; however, the invention is applicable to a secondary battery with any other shape such as a button type or a prismatic type, or a secondary battery with any other configuration such as a laminate configuration in the same manner. Further, the invention is applicable to not only the secondary batteries but also other batteries such as primary batteries.

In the above-described examples, the case where a cyclic carbonate is used as a solvent is described; however, the same tendency is confirmed even in the case where a chain carbonate represented by Chemical Formula 1 which includes a halogen is used.

What is claimed is:
1. An anode comprising:
an anode current collector; and
an anode active material layer arranged on the anode current collector, wherein,
the anode active material layer includes a plurality of anode active material particles, each anode active material particle including silicon, tin, or both as an element, and
the anode active material includes a coating film including (a) an oxide of at least one kind selected from the group consisting of silicon, germanium and tin and (b) a halide of at least one kind selected from the group consisting of silicon, germanium and tin on at least an interior surface of each anode active material particle.

2. The anode according to claim 1, wherein the halide includes a fluoride.

3. The anode according to claim 1, wherein the coating film is formed by a liquid-phase deposition method or a sol-gel method.

4. The anode according to claim 1, wherein the coating film includes a fluorine anion or a compound including fluorine and one kind selected from Group 13 to 15 elements.

5. The anode according to claim 1, wherein the anode active material layer includes a metal including a metal element which is not alloyed with an electrode reactant in gaps between adjacent anode active material particles.

6. The anode according to claim 5, wherein gaps between the anode active material particles are filled with the metal.

7. The anode according to claim 5, wherein the metal element includes at least one kind selected from the group consisting of iron, cobalt, nickel, zinc and copper.

* * * * *